United States Patent
Yamamoto et al.

(10) Patent No.: US 8,127,898 B2
(45) Date of Patent: Mar. 6, 2012

(54) BRAKE DEVICE AND MOTOR WITH SPEED REDUCING MECHANISM

(75) Inventors: Hiroaki Yamamoto, Toyohashi (JP); Katsuhiko Torii, Kosai (JP); Hidenori Ishihara, Hamamatsu (JP); Tomoki Yamashita, Hamamatsu (JP); Nakatsune Shirai, Iwata (JP); Katsumi Endo, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 436 days.

(21) Appl. No.: 12/332,053

(22) Filed: Dec. 10, 2008

(65) Prior Publication Data

US 2009/0152057 A1    Jun. 18, 2009

(30) Foreign Application Priority Data

Dec. 13, 2007  (JP) ................. 2007-322248
Jan. 25, 2008  (JP) ................. 2008-015609
Feb. 26, 2008  (JP) ................. 2008-044799

(51) Int. Cl.
*F16D 55/08* (2006.01)
(52) U.S. Cl. .................. 188/72.8; 188/161
(58) Field of Classification Search ............... 188/72.7, 188/72.8, 161, 162; 192/223.3
See application file for complete search history.

(56) References Cited

U.S. PATENT DOCUMENTS

| 4,756,640 | A | 7/1988 | Gehrke | |
| 6,464,061 | B1 * | 10/2002 | Inoue et al. | 192/223.3 |
| 7,331,432 | B2 * | 2/2008 | Watada | 188/72.7 |
| 7,506,733 | B1 * | 3/2009 | Lee | 188/72.7 |
| 2003/0042084 | A1 * | 3/2003 | Kawase et al. | 188/72.1 |

FOREIGN PATENT DOCUMENTS

| JP | 01-096515 | 6/1989 |
| JP | 09-112518 | 5/1997 |
| JP | 2001-140949 | 5/2001 |
| JP | 2001-337009 | 12/2001 |
| JP | 2002-130336 | 5/2002 |

* cited by examiner

*Primary Examiner* — Christopher Schwartz
(74) *Attorney, Agent, or Firm* — Patterson Thuente Christensen Pedersen, P.A.

(57) ABSTRACT

A brake device arranged between a drive shaft and a driven shaft arranged coaxially with the drive shaft is disclosed. The brake device includes a first rotor, a second rotor, an engagement member, a braking mechanism, and a cam mechanism. The braking mechanism includes a movable friction member rotatable integrally with the second rotor, a fixed friction portion, and an urging member that urges the movable friction member toward the fixed friction portion. When rotational force is provided from the drive shaft to the first rotor, the cam mechanism permits transmission of rotation of the drive shaft to the driven shaft. When the rotational force is provided from the driven shaft to the second rotor, the cam mechanism restricts rotation of the driven shaft. The cam mechanism is provided independently from the engagement member.

18 Claims, 17 Drawing Sheets

BRAKE DEVICE AND MOTOR WITH SPEED REDUCING MECHANISM

BACKGROUND OF THE INVENTION

The present invention relates to a brake device of a motor having a speed reducing mechanism used in a power window device that selectively opens and closes a window glass of, for example, an automobile, and to a motor having a speed reducing mechanism having the brake device.

As a conventional brake device, a brake device described in Japanese Laid-Open Patent Publication No. 2002-130336, for example, is known. The brake device includes a first rotor rotatable integrally with a drive shaft and a second rotor rotatable integrally with a driven shaft, which is arranged coaxially with the drive shaft. The brake device includes a braking mechanism and a cam mechanism. The braking mechanism has a movable friction member rotatable integrally with the second rotor, an urging member arranged between the movable friction member and the second rotor, and a fixed friction portion. The braking mechanism is capable of moving the movable friction member between an engagement position and a non-engagement position while rotating the movable friction member in the same direction as the rotational direction of the drive shaft. When located at the engagement position, the movable friction member contacts the fixed friction portion due to urging force produced by the urging member. When located at the non-engagement position, the movable friction member is spaced from the fixed friction portion against the urging force of the urging member. The cam mechanism moves the movable friction member between the engagement position and the non-engagement position. When rotational force is applied from the drive shaft to the first rotor, the cam mechanism receives the rotational force from the first rotor and switches the position of the movable friction member from the engagement position to the non-engagement position. The rotational force of the first rotor is transmitted to the second rotor through the cam mechanism. In contrast, if rotational force is applied from the driven shaft to the cam mechanism, the cam mechanism restricts rotation of the driven shaft by maintaining the movable friction member at the engagement position.

However, in the above-described brake device, the cam mechanism receives all the rotational force of the first rotor when the rotational force is provided from the drive shaft. It is thus necessary to ensure such strength of the cam mechanism that the cam mechanism tolerates the rotational force. This enlarges the size of the cam mechanism and increases the cost, for example.

BRIEF SUMMARY OF THE INVENTION

Accordingly, it is an objective of the present invention to provide a brake device and a motor having a speed reducing mechanism that allow a cam mechanism to be constructed with low strength, thus reducing the size of the cam mechanism and lowering the cost of the cam mechanism.

To achieve the foregoing objective and in accordance with a first aspect of the present invention, a brake device provided between a drive shaft and a driven shaft arranged coaxially with the drive shaft is provided. The device includes a first rotor, a second rotor, an engagement member, a braking mechanism, and a cam mechanism. The first rotor is provided in a manner rotatable integrally with the drive shaft. The second rotor is arranged in a manner rotatable integrally with the driven shaft. The engagement member causes engagement between the first rotor and the second rotor in such a manner as to allow transmission of rotation. The braking mechanism includes a movable friction member rotatable integrally with the second rotor, a fixed friction portion, and an urging member that urges the movable friction member toward the fixed friction portion. The movable friction member is movable between an engagement position at which the movable friction member contacts and is engaged with the fixed friction portion and a non-engagement position at which the movable friction member is separated from the fixed friction portion. The cam mechanism moves the movable friction member between the engagement position and the non-engagement position. When rotational force is provided from the drive shaft to the first rotor, the cam mechanism moves the movable friction member from the engagement position to the non-engagement position so as to allow transmission of the rotation of the drive shaft to the driven shaft through the first rotor and the second rotor. When the rotational force is provided from the driven shaft to the second rotor, the cam mechanism maintains the movable friction member at the engagement position so as to restrict the rotation of the driven shaft. The cam mechanism is provided independently from the engagement member.

In accordance with a second aspect of the present invention, a motor with a speed reducing mechanism is provided. The motor includes a motor body having a drive shaft, a speed reducing portion having a worm shaft arranged coaxially with the drive shaft, and a brake device arranged between the drive shaft and the worm shaft. The brake device includes a first rotor, a second rotor, an engagement member, a braking mechanism, and a cam mechanism. The first rotor is provided in a manner rotatable integrally with the drive shaft. The second rotor is arranged in a manner rotatable integrally with the driven shaft. The engagement member causes engagement between the first rotor and the second rotor in such a manner as to allow transmission of rotation. The braking mechanism includes a movable friction member rotatable integrally with the second rotor, a fixed friction portion, and an urging member that urges the movable friction member toward the fixed friction portion. The movable friction member is movable between an engagement position at which the movable friction member contacts and is engaged with the fixed friction portion and a non-engagement position at which the movable friction member is separated from the fixed friction portion. The cam mechanism moves the movable friction member between the engagement position and the non-engagement position. When rotational force is provided from the drive shaft to the first rotor, the cam mechanism moves the movable friction member from the engagement position to the non-engagement position so as to allow transmission of rotation of the drive shaft to the driven shaft through the first rotor and the second rotor. When the rotational force is provided from the driven shaft to the second rotor, the cam mechanism maintains the movable friction member at the engagement position so as to restrict the rotation of the driven shaft. The cam mechanism is provided independently from the engagement member.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The features of the present invention that are believed to be novel are set forth with particularity in the appended claims. The invention, together with objects and advantages thereof.

DETAILED DESCRIPTION OF THE INVENTION

A first embodiment of the present invention will now be described with reference to FIGS. 1 to 8B.

Figure 1:
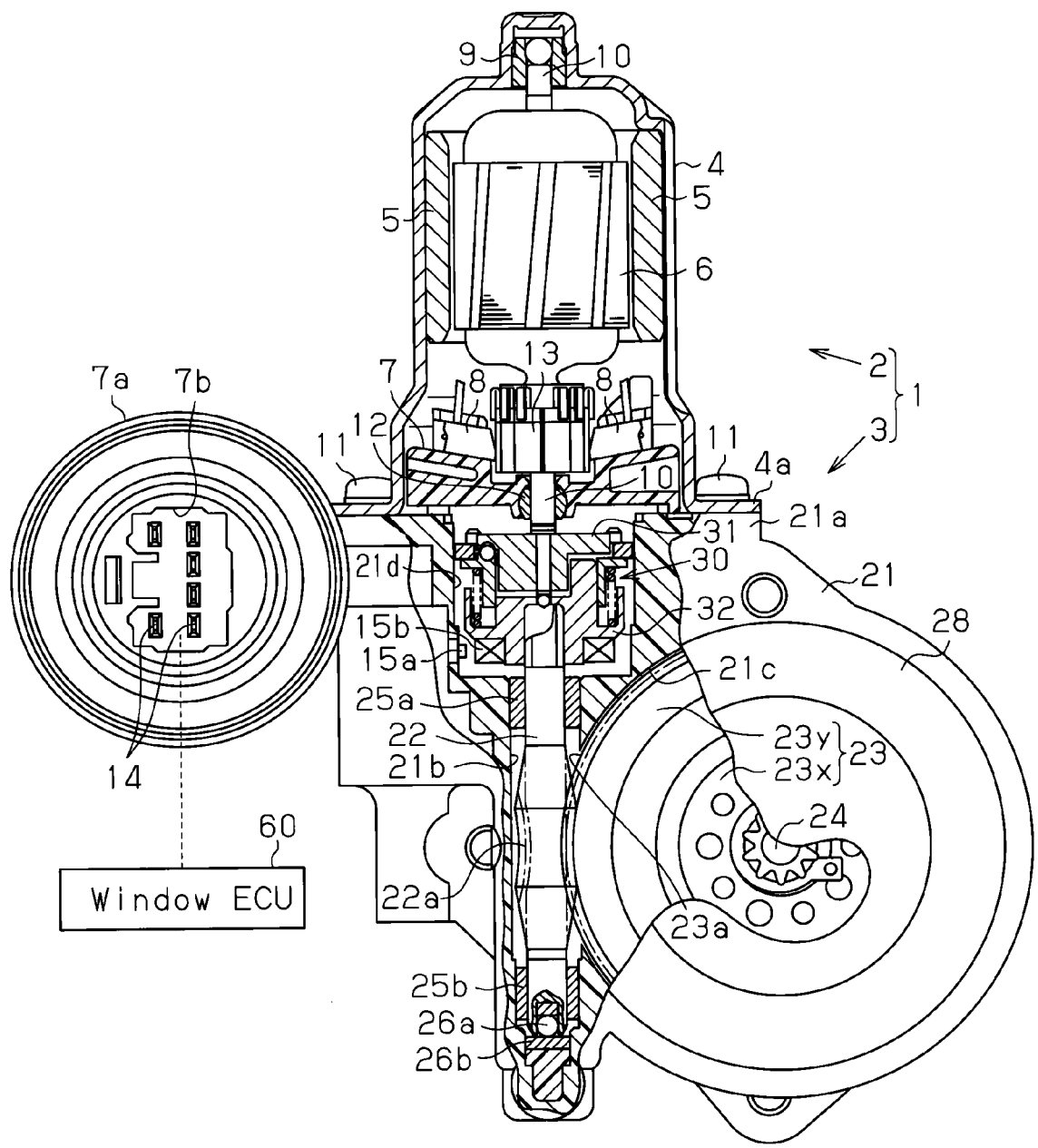
FIG. 1 is a cross-sectional side view showing a motor according to a first embodiment of the present invention.

A motor 1, as illustrated in FIG. 1, is a motor having a speed reducer including a motor body 2 and a speed reducing portion 3, which is used in a power window device that selectively opens and closes a window glass of a vehicle.

The motor body 2 has a yoke housing 4, a pair of magnets 5, an armature 6, a brush holder 7, and a pair of brushes 8. The yoke housing 4 is shaped substantially as a lidded flat cylinder, and the magnets 5 are secured to the inner surface of the yoke housing 4. A bearing 9 extends from the center of the bottom of the yoke housing 4 in the axial direction of the yoke housing 4. The bearing 9 rotatably supports the proximal end of a rotary shaft 10, or the drive shaft, of the armature 6.

An opening end 4a of the yoke housing 4 is shaped like a flange and secured to an opening end 21a of a gear housing 21, which will be explained below, by means of threads 11. By securing the opening end 4a of the yoke housing 4 to the opening end 21a of the gear housing 21, the brush holder 7 is fixed to the yoke housing 4 and the gear housing 21.

In the yoke housing 4, the brush holder 7 holds a bearing 12, which rotatably supports the distal end of the rotary shaft 10 of the armature 6, and the brushes 8, which slidably contact a commutator 13 secured to the rotary shaft 10. A connector portion 7a projecting radially outward of each one of the housings 4, 21 is arranged in the vicinity of the brush holder 7 in the housings 4, 21. The connector portion 7a has a recess 7b in which a plurality of terminals 14 are exposed. The terminals 14 are connectable to a connector (not shown) extending from the body frame of the vehicle. The terminals 14 are electrically connected to the brushes 8 and a rotation sensor 15a, which is provided in the motor 1. The rotation sensor 15a is formed by an annular sensor magnet 15b secured to a second rotor 32, which will be described below, and the rotation sensor 15a, which is secured at the position radially opposed to the sensor magnet 15b in the gear housing 21. The sensor magnet 15b has magnetic poles that are different in an alternate manner in the circumferential direction of the second rotor 32. The rotation sensor 15a detects information regarding rotation, which is, for example, the rotational direction or the number of rotation of the second rotor 32.

By connecting the connector portion 7a to the connector, which extends from the vehicle body frame, the motor 1 and a window ECU 60, which is provided in the vehicle body frame, are electrically connected to each other. The motor 1 thus receives outputs such as electricity or sensor signals.

The speed reducing portion 3 has the gear housing 21, a worm shaft 22, a worm wheel 23, an output shaft 24, and a brake device 30.

The gear housing 21 is formed of resin and accommodates the worm shaft 22, the worm wheel 23, and the brake device 30.

The gear housing 21 includes a shaft accommodating cylindrical portion 21b, a wheel accommodating recess 21c, and a brake accommodating recess 21d. The shaft accommodating cylindrical portion 21b is formed substantially as a cylinder extending from the opening end 21a in the axial direction of the gear housing 21 in such a manner as to receive the worm shaft 22. The wheel accommodating recess 21c communicates with the shaft accommodating cylindrical portion 21b in such a manner as to accommodate the worm wheel 23. The brake accommodating recess 21d is formed close to the proximal end of the shaft accommodating cylindrical portion 21b, or the motor body 2, in such a manner as to receive the brake device 30.

A pair of bearings 25a, 25b are arranged in the shaft accommodating cylindrical portion 21b and axially spaced apart at a predetermined interval. The bearings 25a, 25b rotatably support the worm shaft 22 coaxially with the rotary shaft 10 in the shaft accommodating cylindrical portion 21b. A worm 22a, which is engaged with the worm wheel 23, is formed in the portion of the worm shaft 22 between the portion supported by the bearing 25a and the portion supported by the bearing 25b. The diameter of the axially middle portion of the worm 22a is smaller than the diameter of each axial end of the worm 22a in such a manner that the axially middle portion of the worm 22a extends along the outer circumferential portion of the worm wheel 23. This enlarges the engagement range between the worm 22a and the worm wheel 23, thus enhancing the strength of the engagement portion (31e) of the worm 22a and the worm wheel 23. A thrust receiving ball 26a and a thrust receiving plate 26b are arranged at the distal end of the worm shaft 22 to receive thrust load from the worm shaft 22.

The wheel accommodating recess 21c accommodates the worm wheel 23, which is engaged with the worm 22a of the worm shaft 22, in such a manner that the worm wheel 23 is rotatable about the output shaft 24. The worm wheel 23 includes a metal reinforcement plate 23x connected to the output shaft 24 and a resin gear portion 23y, which is formed integrally with an outer circumferential portion of the reinforcement plate 23x. A toothed portion 23a having flat tooth tips, which is engaged with the worm 22a of the worm shaft 22, is formed at an outer circumferential portion of the gear portion 23y formed of resin. The opening end of the wheel accommodating recess 21c, which supports the worm wheel 23, is closed by a cover member 28. The cover member 28 supports the proximal end surface of the output shaft 24. A window regulator (not shown), which selectively opens and closes a window glass, is operatively connected to the output shaft 24.

[Configuration of Brake Device 30]

Figure 2A:
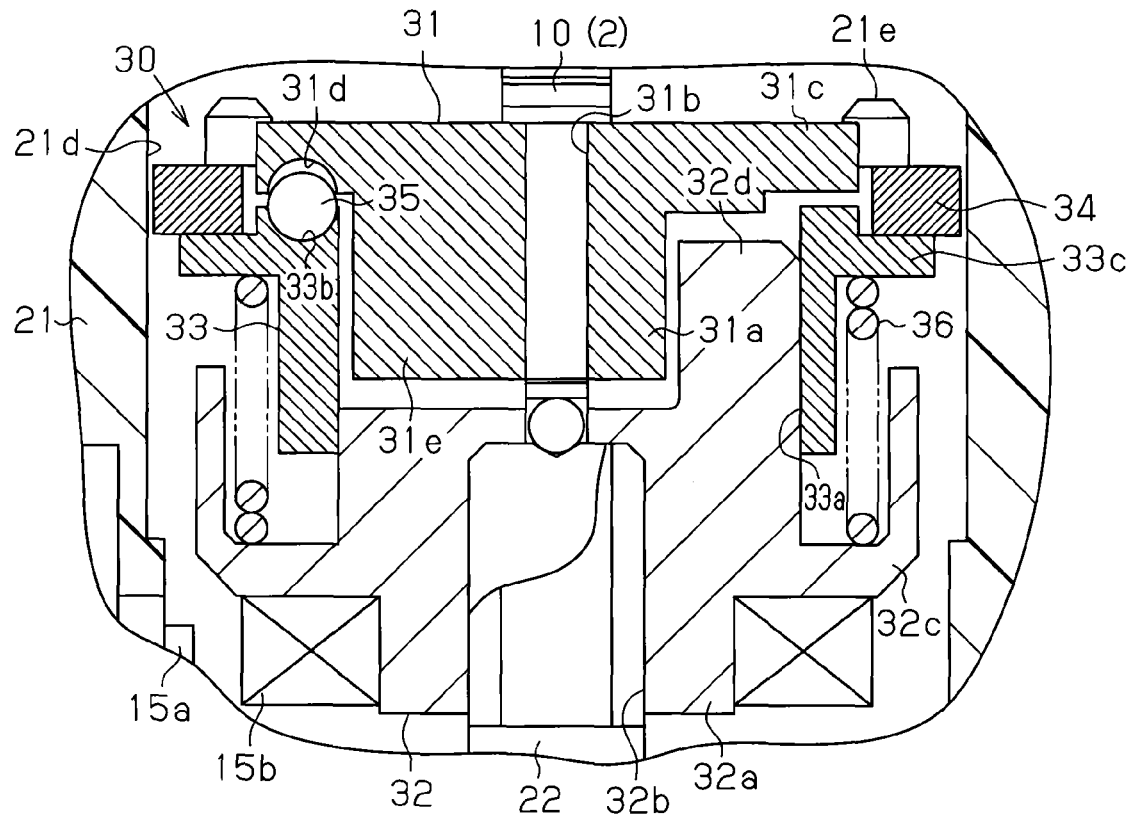
FIG. 2A is a cross-sectional side view showing a brake device mounted in the motor illustrated in FIG. 1.
Figure 2B:
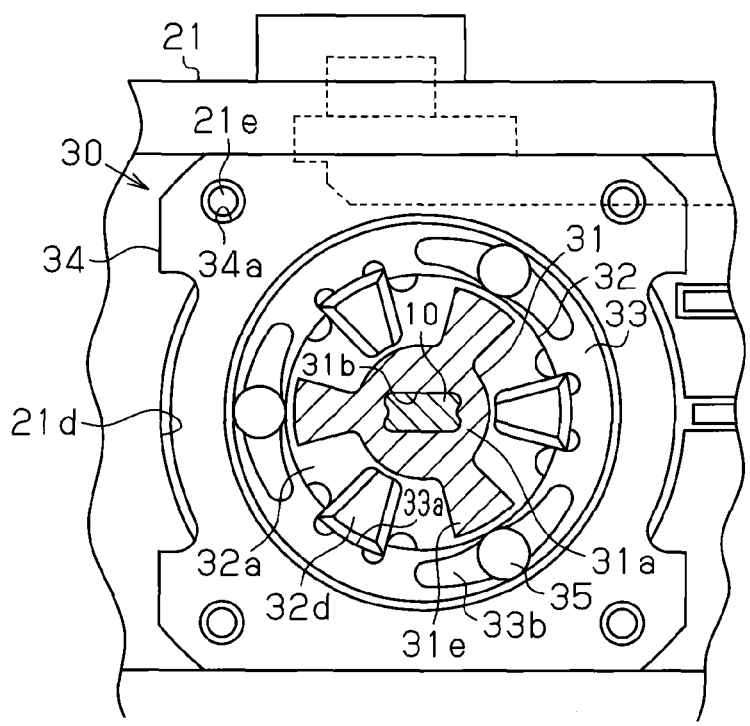
FIG. 2B is a cross-sectional plan view showing the brake device illustrated in FIG. 2A.

The brake accommodating recess 21d accommodates the brake device 30, which is arranged between the worm shaft 22 and the rotary shaft 10. As illustrated in FIGS. 2A and 2B, the brake device 30 has a first rotor 31 and a second rotor 32. The first rotor 31 is connected to the rotary shaft 10 in such a manner as to rotate integrally with the rotary shaft 10. The second rotor 32 is connected to the worm shaft 22 in such a manner as to rotate integrally with the worm shaft 22. The brake device 30 also has a movable friction member 33 and a fixed friction member (a fixed friction portion) 34. The movable friction member 33 is rotatable integrally with the second rotor 32. The fixed friction member 34 is fixed to the gear housing 21.

Figure 3A:
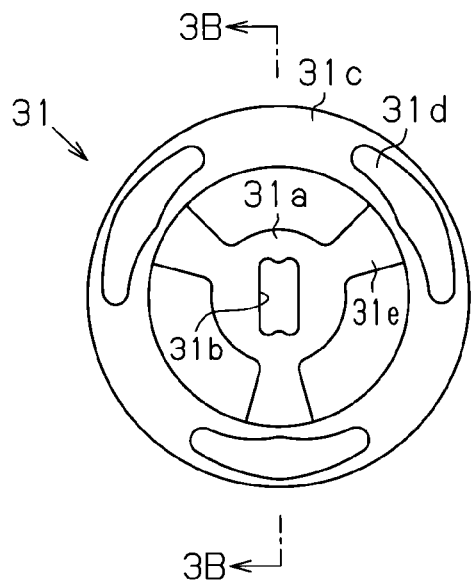
FIG. 3A is a plan view showing a first rotor of the motor illustrated in FIG. 1.
Figure 3B:
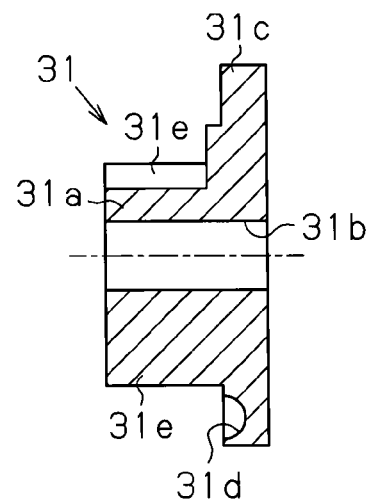
FIG. 3B is a cross-sectional view taken along line 3B-3B, showing the first rotor illustrated in FIG. 3A.
Figure 3C:
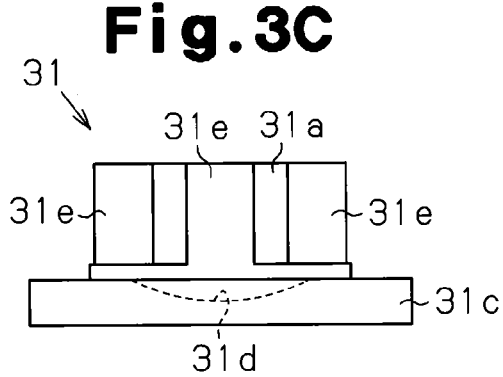
FIG. 3C is a front view showing the first rotor illustrated in FIG. 3A.
Figure 4A:
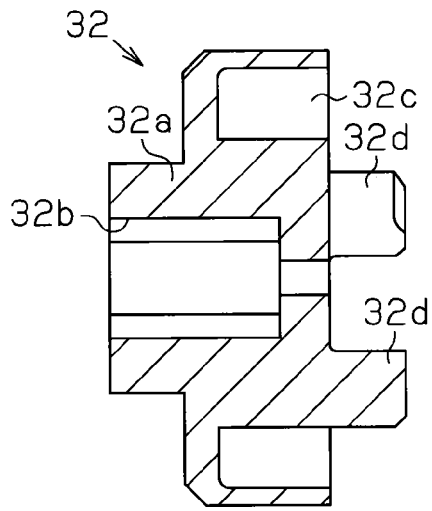
FIG. 4A is a cross-sectional side view showing a second rotor of the motor illustrated in FIG. 1.
Figure 4B:
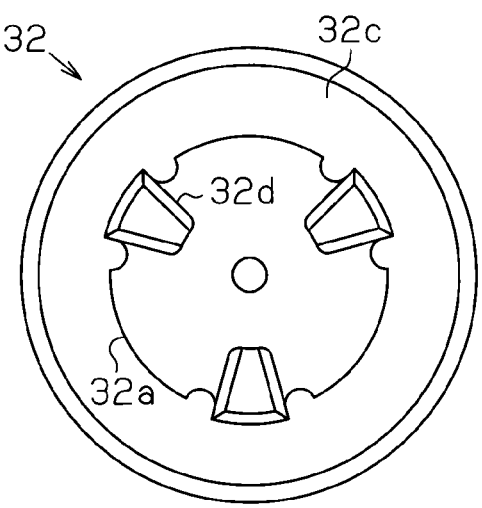
FIG. 4B is a plan view showing the second rotor illustrated in FIG. 4A.
Figure 5A:
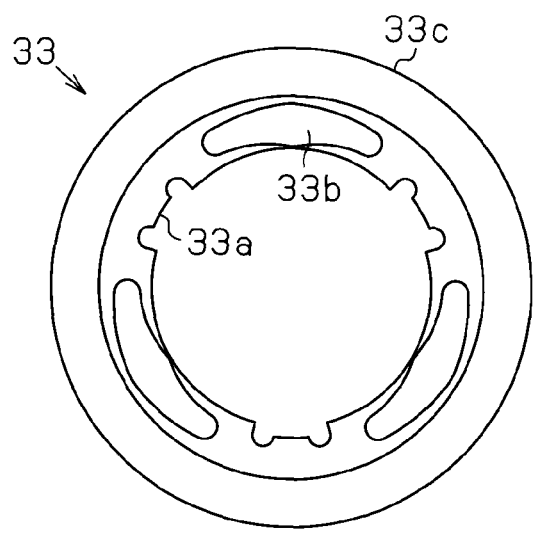
FIG. 5A is a plan view showing a movable friction member of the motor illustrated in FIG. 1.
Figure 5B:
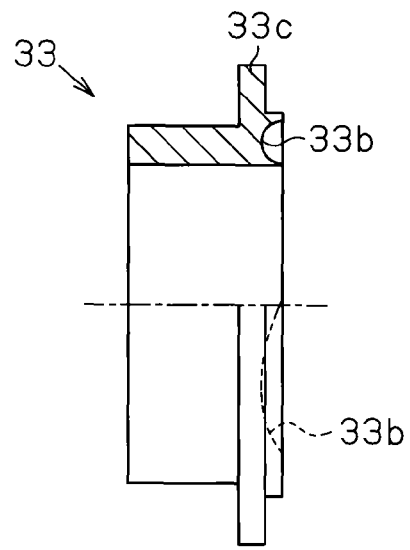
FIG. 5B is a side view showing the movable friction member illustrated in FIG. 5A.

With reference to FIGS. 3A to 3C, the first rotor 31 has a cylindrical portion 31a, which has a circular shape as viewed from above, and a plurality of engagement portions 31e extending radially about the cylindrical portion 31a. The engagement portions 31e are arranged in the circumferential direction of the cylindrical portion 31a and spaced apart at equal circumferential intervals. In the first embodiment, there are three engagement portions 31e. A fixing hole 31b, which receives a distal portion of the rotary shaft 10, is formed in the cylindrical portion 31a and extends along the axis of the cylindrical portion 31a. By inserting the distal portion of the rotary shaft 10 through the fixing hole 31b, the rotary shaft 10 becomes rotatable integrally with the cylindrical portion 31a. The distal portion of the rotary shaft 10 and the fixing hole 31b each have a flat cross section. An extended flange portion 31c, which is connected integrally with the engagement portions 31e, is formed at the end of the first rotor 31 closer to the motor body 2. A plurality of cam grooves 31d, each extending in the circumferential direction of the flange portion 31c, are formed in the surface of the flange portion 31c facing the movable friction member 33. The cam grooves 31d are spaced apart at equal circumferential intervals and extend in the circumferential direction of the flange portion 31c. In the first embodiment, there are three cam grooves 31d. As illustrated in FIG. 3C, the bottom surface of each of the cam grooves 31d is curved in such a manner that the bottom surface is deepest at the circumferential center of the cam groove 31d and becomes gradually shallower toward the circumferential end. The engagement portions 31e are each arranged at the position corresponding to the circumferential center of the corresponding cam groove 31d.

As illustrated in FIGS. 2A, 2B, 4A, and 4B, the second rotor 32 has a cylindrical portion 32a, which is formed at the radial center of the second rotor 32 and extends in the axial direction. A fixing hole 32b, which receives the worm shaft 22, is formed in the cylindrical portion 32a and extends along the axis of the cylindrical portion 32a. A spring support portion 32c, which has an opening toward the motor body 2, is arranged in an outer circumferential portion of the cylindrical portion 32a. A plurality of engagement portions 32d, which project toward the motor body 2 along the axial direction of the cylindrical portion 32a, are formed at a distal portion of the cylindrical portion 32a closer to the motor body 2 and arranged along the circumferential direction of the cylindrical portion 32a. The engagement portions 32d are spaced apart at equal circumferential intervals and each extend along the circumferential direction of the cylindrical portion 32a. In the first embodiment, there are three engagement portions 32d. The cylindrical portion 31a of the first rotor 31 is located radially inward of the engagement portions 32d. The engagement portions 31e of the first rotor 31 and the engagement portions 32d of the second rotor 32 are arranged alternately in the circumferential direction. In the first embodiment, the engagement portions 32d and the engagement portions 31e of the first rotor 31 each form an engagement member.

With reference to FIGS. 2A, 2B, 5A, and 5B, the movable friction member 33 is shaped substantially as a cylinder. A plurality of engagement grooves 33a, which extend axially, are formed in the inner circumferential surface of the movable friction member 33. The engagement grooves 33a are spaced apart at equal circumferential intervals and extend in the circumferential direction of the movable friction member 33. In the first embodiment, there are three engagement grooves 33a. Each one of the engagement grooves 33a receives the corresponding one of the engagement portions 32d of the second rotor 32. This arrangement prevents the second rotor 32 from moving circumferentially relative to the movable friction member 33. In other words, the movable friction member 33 is allowed to rotate integrally with the second rotor 32 and move axially.

The distal surface of the movable friction member 33 closer to the motor body 2 faces the flange portion 31c of the first rotor 31. A plurality of cam grooves 33b each shaped identically with the cam grooves 31d of the first rotor 31 are formed in the distal surface of the movable friction member 33 and spaced apart at equal circumferential intervals, each extending in the circumferential direction of the movable friction member 33. In the first embodiment, there are three cam grooves 33b. The cam grooves 33b are arranged as axially opposed to the corresponding cam grooves 31d of the first rotor 31. With reference to FIG. 2A, a spherical body 35 serving as a rolling body is arranged between each one of the cam grooves 31d and the opposed one of the cam grooves 33b. In the first embodiment, the cam grooves 31d, the cam grooves 33b, and the spherical bodies 35 configure cam mechanisms.

A circumferentially middle portion of each one of the cam grooves 31d and the cam grooves 33b is shaped in such a manner as to receive a substantial half of the corresponding one of the spherical bodies 35. The radial width of each cam groove 31d, 33b becomes gradually smaller toward both circumferential ends. The radial width of each cam groove 31d and the radial width of each cam groove 33b are both smaller than the diameter of each spherical body 35 at portions other than the circumferential centers. As a result, as the first rotor 31 rotates and thus each one of the spherical bodies 35 moves relative to either one of the circumferential ends of the corresponding one of the cam grooves 31d, 33b, the spherical body 35 axially projects from the cam groove 31d, 33b. Contrastingly, when the circumferential center of each cam groove 31d faces the circumferential center of the corresponding cam groove 33b, the associated spherical body 35 is received in the cam groove 31d and the cam groove 33b. Specifically, the cam grooves 31d and the cam grooves 33b are each formed in such a manner that a portion of the corresponding spherical body 35 is constantly retained in the cam groove 31d, 33b. Each spherical body 35 is thus prevented from coming off the corresponding cam groove 31d or cam groove 33b.

The movable friction member 33 has a pressing contact portion 33c, which is provided in the vicinity of the distal portion of the movable friction member 33 and extends radially outward. The pressing contact portion 33c is capable of contacting the fixed friction member 34, which is arranged at the side of the movable friction member 33 closer to the motor body 2.

Figure 6A:
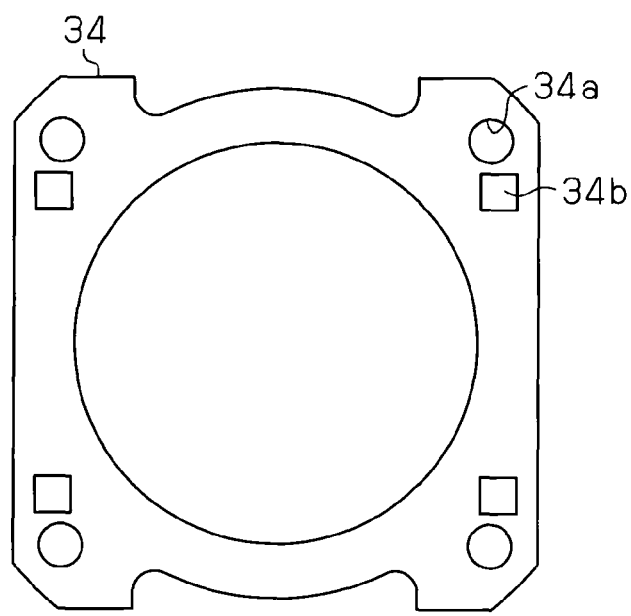
FIG. 6A is a plan view showing a fixed friction member of the motor illustrated in FIG. 1.
Figure 6B:
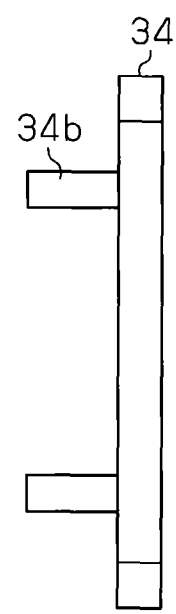
FIG. 6B is a side view showing the fixed friction member illustrated in FIG. 6A.

As illustrated in FIG. 2B, the fixed friction member 34 has an annular shape and a plurality of securing holes 34a are provided at predetermined positions of the fixed friction member 34. A plurality of securing projections 21e, which project from the gear housing 21 toward the motor body 2, are engaged with the corresponding securing holes 34a. This arrangement fixes the fixed friction member 34 to the gear housing 21. With reference to FIGS. 6A and 6B, a plurality of positioning projections 34b, which project toward the worm shaft 22, are formed on the fixed friction member 34. The fixed friction member 34 is positioned with respect to the gear housing 21 by means of the positioning projections 34b. The fixed friction member 34 and the movable friction member 33 are arranged radially outward of the engagement portion 31e of the first rotor 31 and the engagement portion 32d of the second rotor 32.

As shown in FIG. 2A, a plurality of springs 36 each serving as an urging member are arranged between the second rotor 32 and the movable friction member 33. Specifically, the proximal portions of the springs 36 are supported by the spring support portion 32c of the second rotor 32 while the distal portions of the springs 36 are held in contact with the pressing contact portion 33c of the movable friction member 33. The springs 36 urge the movable friction member 33 toward the motor body 2 so that the pressing contact portion 33c of the movable friction member 33 are pressed to contact the fixed friction member 34. In the first embodiment, the movable friction member 33, the fixed friction member 34, and the springs 36 configure a braking mechanism.

[Operation of Brake Device 30]

Operation of the brake device 30 will now be explained with reference to FIGS. 7 and 8.

Figure 7A:
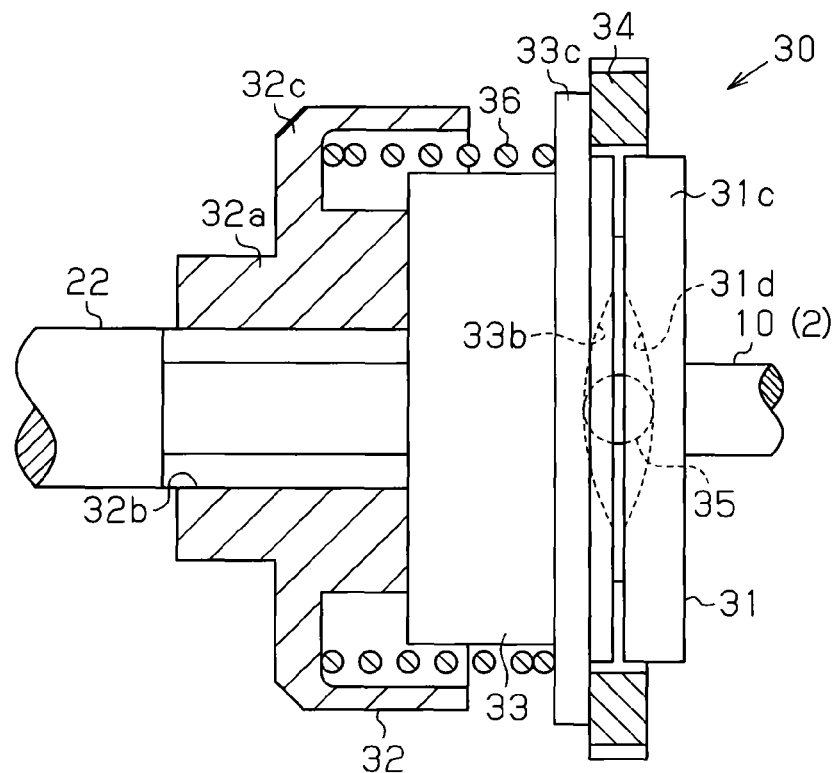
FIG. 7A is a cross-sectional side view showing a brake device of a motor when the motor is not in operation.
Figure 7B:
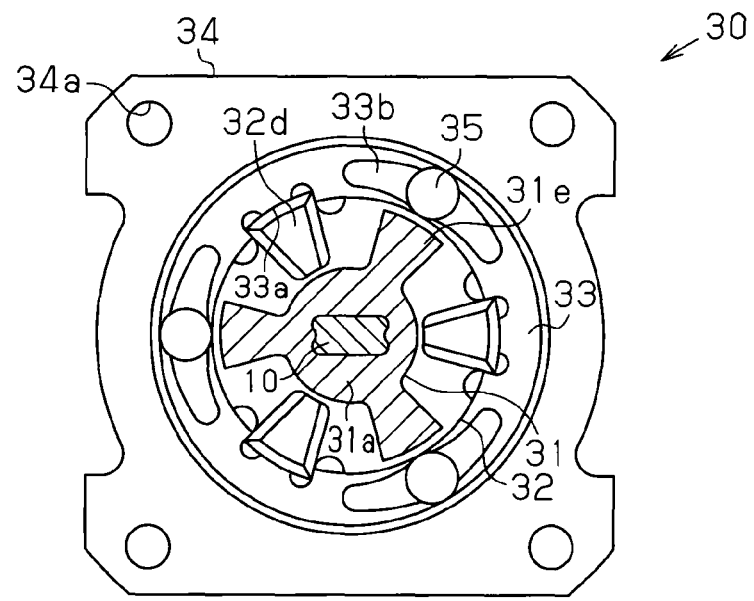
FIG. 7B is a plan view showing the brake device illustrated in FIG. 7A.

When the motor body 2 is not in operation, or the first rotor 31 is not receiving rotational force, the brake device 30 is in the state illustrated in FIGS. 7A and 7B. In this state, each one of the cam grooves 31d of the first rotor 31 and the corresponding one of the cam grooves 33b of the movable friction member 33 are arranged at opposed positions. The spherical bodies 35 are each located at the circumferential centers of the corresponding cam grooves 31d, 33b. The movable friction member 33 receives urging force of the springs 36 and is thus held in contact with the fixed friction member 34 in a pressed manner. In other words, the movable friction member 33 is provided at an engagement position at which the movable friction member 33 is engaged with the fixed friction member 34 in such a manner that the movable friction member 33 is prohibited from rotating relative to the fixed friction member 34.

In this state, friction force generating between the pressing contact portion 33c of the movable friction member 33 and the fixed friction member 34 prohibits the movable friction member 33 and the second rotor 32 from rotating relative to the fixed friction member 34. This prevents the worm shaft 22, the worm wheel 23, and the output shaft 24 from rotating. As a result, the window glass is prevented from falling or being opened by a person with malicious intention, and thus a car theft is prevented.

Figure 8A:
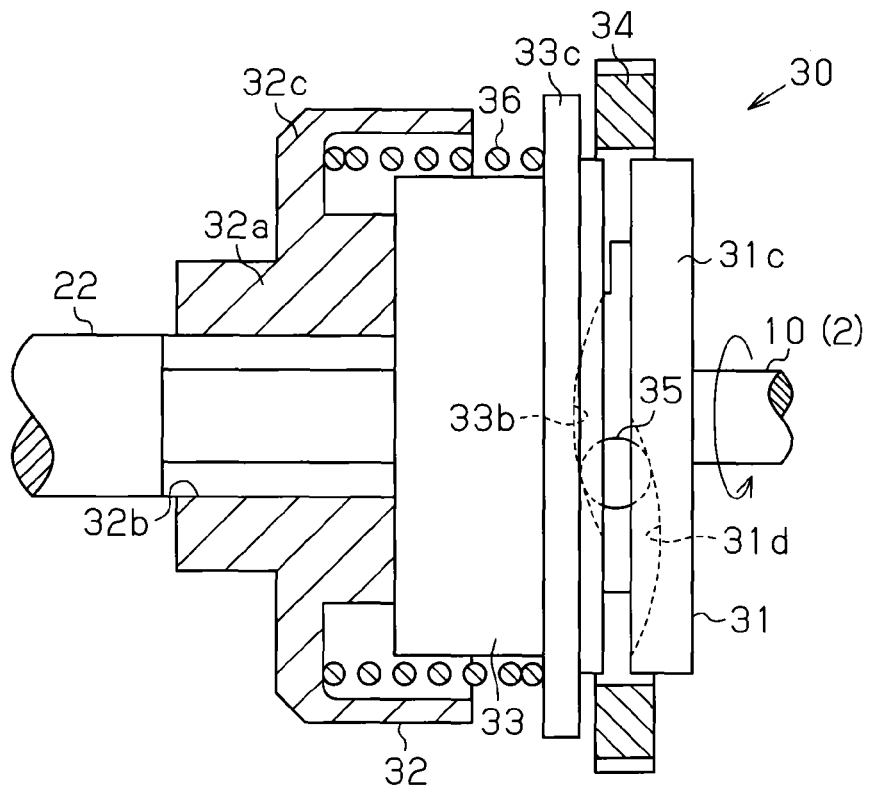
FIG. 8A is a cross-sectional side view showing the brake device of the motor when the motor is in operation.
Figure 8B:
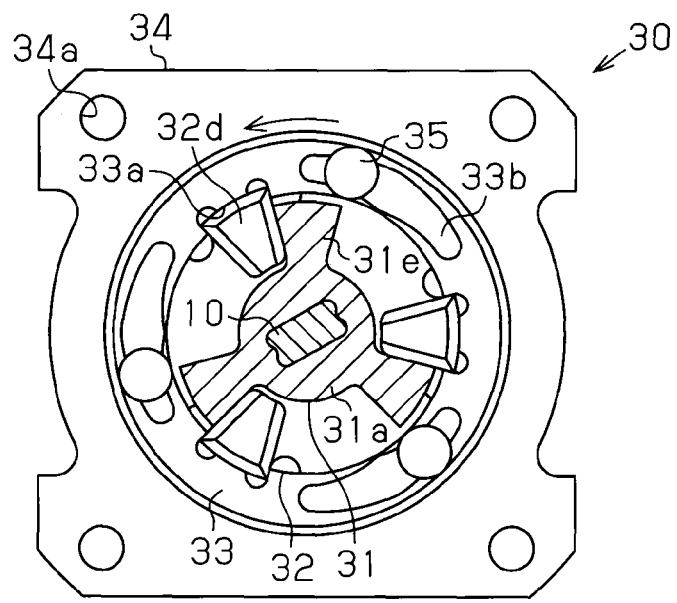
FIG. 8B is a plan view showing the brake device illustrated in FIG. 8A.

In contrast, as illustrated in FIG. 8A, the motor body 2 is driven and the rotational force is input to the first rotor 31, the cam grooves 31d of the first rotor 31 are displaced from the cam grooves 33b of the movable friction member 33 along the rotational direction of the first rotor 31. At this state, each spherical body 35 rolls and moves relatively toward either one of the circumferential ends of the corresponding cam groove 31d, 33b. This causes the spherical body 35 to project axially from the cam groove 31d of the first rotor 31 toward the movable friction member 33. The pressing contact portion 33c then presses the movable friction member 33 against the urging force of each spring 36. The movable friction member 33 is thus separated from the fixed friction member 34 so that the movable friction member 33 is moved to a non-engagement position at which the movable friction member 33 is rotatable relative to the fixed friction member 34. Also in this state, referring to FIG. 8B, as the first rotor 31 rotates, the engagement portion 31e of the first rotor 31 becomes engaged with the engagement portion 32d of the second rotor 32. The engagement portion 31e of the first rotor 31 and the engagement portion 32d of the second rotor 32 contact each other in a surface contact manner. The engagement portion 31e and the engagement portion 32d become engaged with each other at the same time as (or slightly after) the movable friction member 33 is moved to the non-engagement position. In other words, the engagement portion 31e and the engagement portion 32d are engaged with each other when the movable friction member 33 is switched to the non-engagement position.

As has been described, by switching the movable friction member 33 to the non-engagement position so that the first rotor 31 becomes engaged with the second rotor 32, rotation of the first rotor 31 is allowed to be transmitted to the second rotor 32 and thus the second rotor 32 rotates integrally with the first rotor 31. Such rotation of the second rotor 32 rotates the output shaft 24 through the worm shaft 22 and the worm wheel 23, thus actuating the window regulator in order to selectively open and close the window glass.

The first embodiment has the following advantages.

(1) In the first embodiment, when the rotational force is provided to the rotary shaft 10 serving as the drive shaft, the cam grooves 31d, the cam grooves 33b, and the spherical bodies 35, which configure the cam mechanisms, receive the rotational force from the first rotor 31. This switches the movable friction member 33 from the engagement position to the non-engagement position. The rotational force of the rotary shaft 10 is thus transmitted to the worm shaft 22 serving as the driven shaft through the rotors 31, 32. When the rotational force is provided to the worm shaft 22, the movable friction member 33 is maintained at the engagement position to prohibit the worm shaft 22 from rotating. The cam mechanisms are provided independently from the engagement portion 31e and the engagement portion 32d, each serving as an engagement member that causes engagement between the first rotor 31 and the second rotor 32. The cam mechanisms are thus located outside the transmission path of the rotational force. This makes it unnecessary for each of the cam mechanisms to have strength necessary for tolerating transmission of the rotational force. The cam mechanisms thus can be formed with low strength, which reduces the cam mechanisms in size and decreases the cost.

(2) In the first embodiment, the engagement portions 31e, 32d become engaged with each other, with the movable friction member 33 switched to the non-engagement position. As a result, while the worm shaft 22 is allowed to rotate, rotation of the rotary shaft 10 is transmitted to the worm shaft 22. This rotates the rotary shaft 10 and the worm shaft 22 smoothly.

(3) In the first embodiment, the multiple cam mechanisms (each formed by the cam grooves 31d, 33b and the corresponding spherical body 35) are spaced apart at equal circumferential intervals, extending in the circumferential direction of the movable friction member 33. This ensures stable switching of the movable friction member 33 between the engagement position and the non-engagement position.

(4) In the first embodiment, the cam mechanisms include the cam grooves 31d formed in the first rotor 31, the opposed cam grooves 33b, which are formed in the movable friction member 33 to face the cam grooves 33b, and the spherical bodies 35, which are arranged between the cam grooves 31d, 33b. This arrangement allows the cam mechanisms to smoothly switch the movable friction member 33 between the engagement position and the non-engagement position.

(5) In the first embodiment, the movable friction member 33 and the fixed friction member 34 are located radially outward of the engagement portions 31e, 32d. As a result, engagement between the movable friction member 33 and the fixed friction member 34 increases the rotation restriction force by which rotation of the worm shaft 22 is restricted and reduces the size of the brake device 30.

(6) In the first embodiment, the movable friction member 33 and the fixed friction member 34 both have an annular shape and are arranged coaxially with each other. This further increases the rotation restriction force of the worm shaft 22, which is provided through the engagement between the movable friction member 33 and the fixed friction member 34.

(7) In the first embodiment, the engagement member includes the engagement portion 31e provided in the first rotor 31 and the engagement portion 32d formed in the second rotor 32. When the first rotor 31 rotates relative to the second rotor 32, the engagement portion 31e and the engagement portion 32d become engaged with each other. This optimally transmits rotation of the first rotor 31 to the second rotor 32.

(8) In the first embodiment, the spring support portion 32c of the second rotor 32 has an opening facing the motor body 2. The springs 36 are thus stably supported by the spring support portion 32c.

A second embodiment of the present invention will hereafter be explained with reference to FIGS. 9A to 13. The second embodiment is different from the first embodiment in terms of the configuration of the brake device 30. Same or like reference numerals are given to components of the second embodiment that are the same as or like corresponding components of the first embodiment and detailed description thereof will be omitted.

[Configuration of Brake Device 30]

Figure 9A:
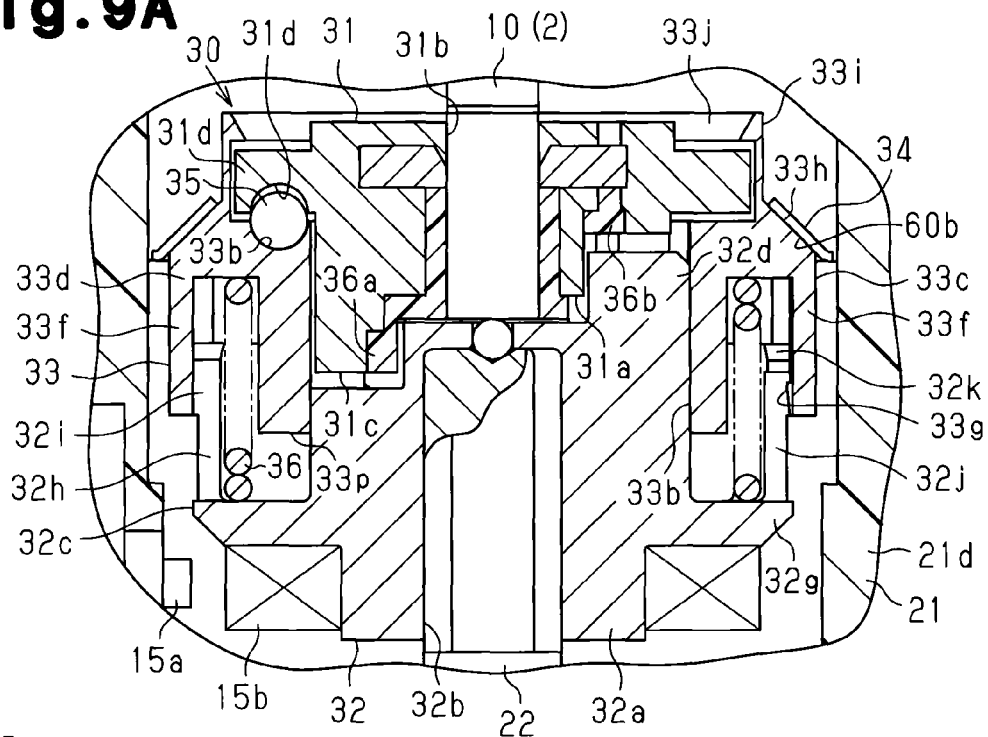
FIG. 9A is a cross-sectional side view showing a brake device according to a second embodiment of the present invention.

As shown in FIG. 9A, like the first embodiment, the brake device 30 of the second embodiment has the movable friction member 33, which is rotatable integrally with the second rotor 32, and the spring 36 serving as the urging member arranged between the second rotor 32 and the movable friction member 33.

Figure 10B:
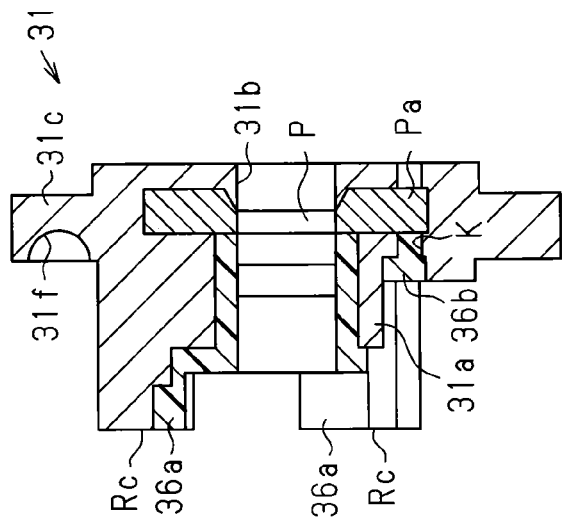
FIG. 10B is a cross-sectional view taken along line 10B-10B of FIG. 10A.
Figure 10A:
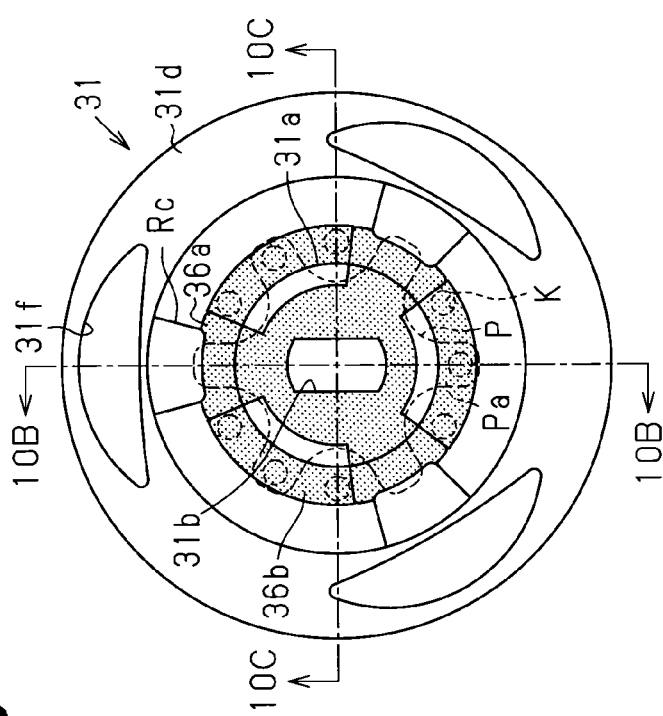
FIG. 10A is a plan view illustrating a first rotor of the motor illustrated in FIG. 9A as viewed from the side corresponding to a worm shaft.
Figure 10C:
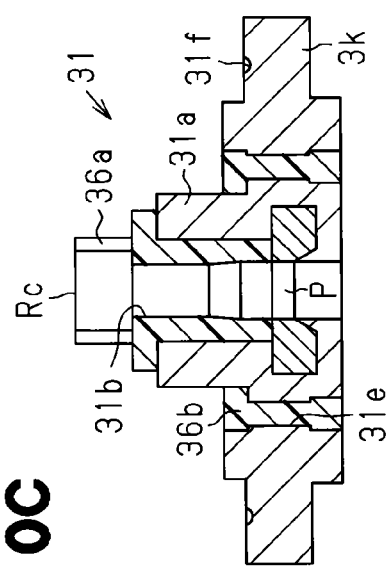
FIG. 10C is a cross-sectional view taken along line 10C-10C of FIG. 10A.
Figure 11C:
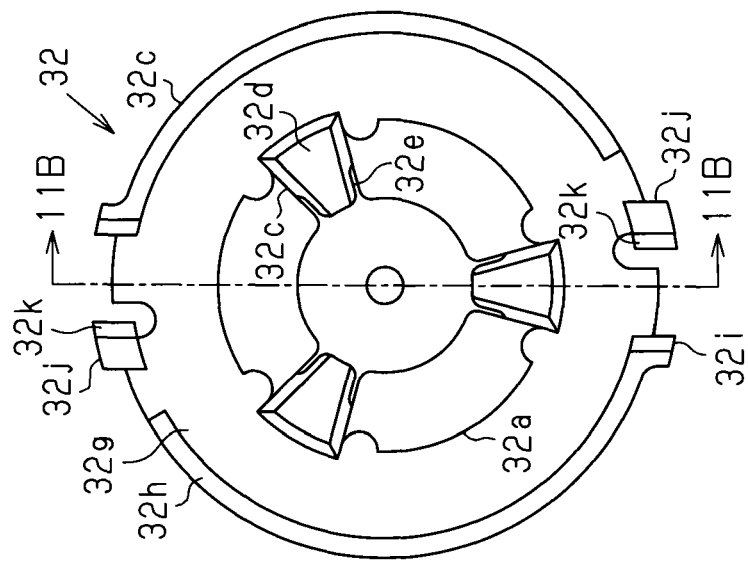
FIG. 11C is a plan view illustrating the second rotor illustrated in FIG. 11A as viewed from the side corresponding to a rotary shaft.
Figure 11B:
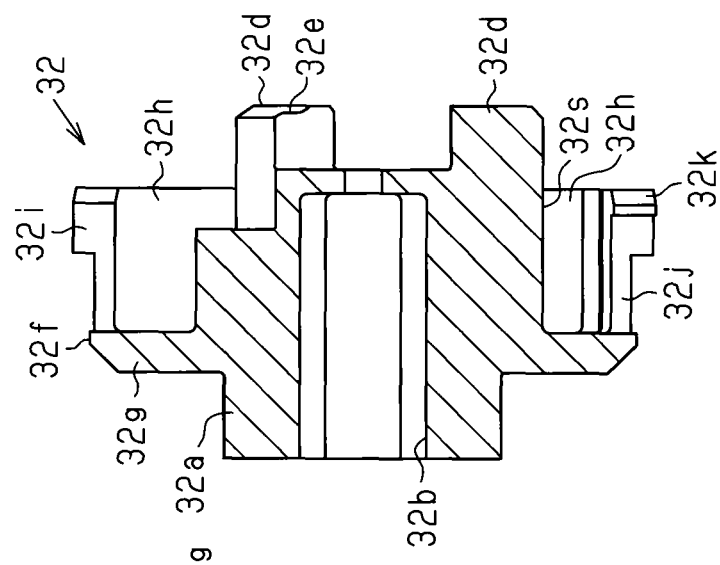
FIG. 11B is a plan view showing the second rotor illustrated in FIG. 11A.
Figure 11A:
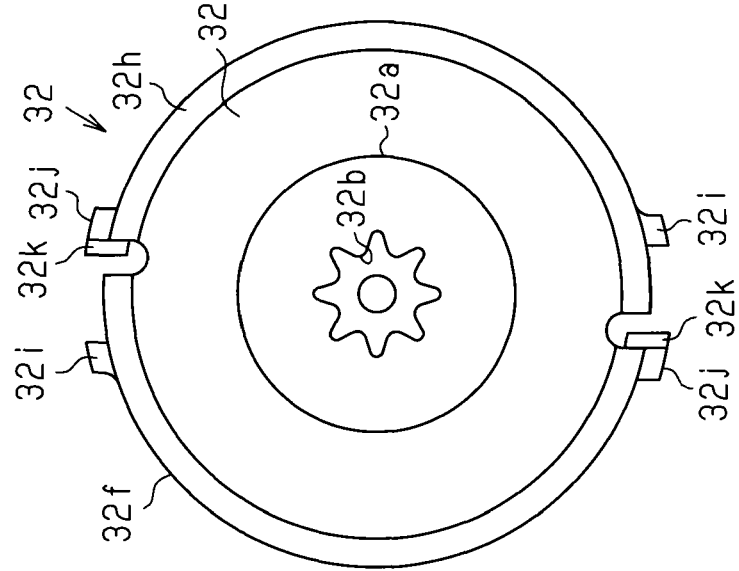
FIG. 11A is a plan view illustrating a second rotor of the motor illustrated in FIG. 9A as viewed from the side corresponding to the worm shaft.
Figure 12A:
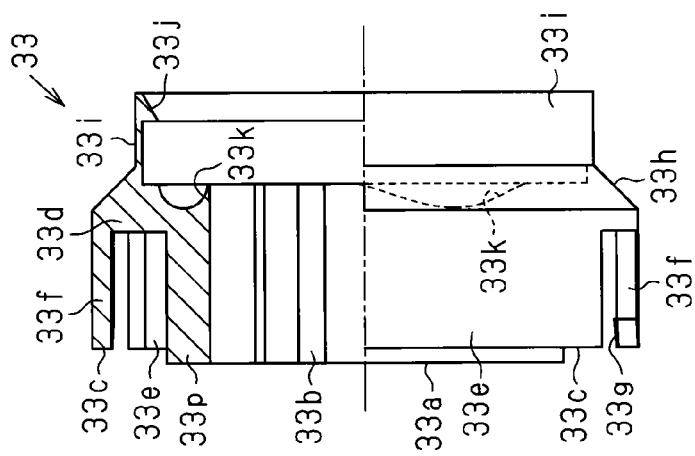
FIG. 12A is a plan view showing a braking member of the motor illustrated in FIG. 9A as viewed from the side corresponding to the worm shaft.
Figure 12B:
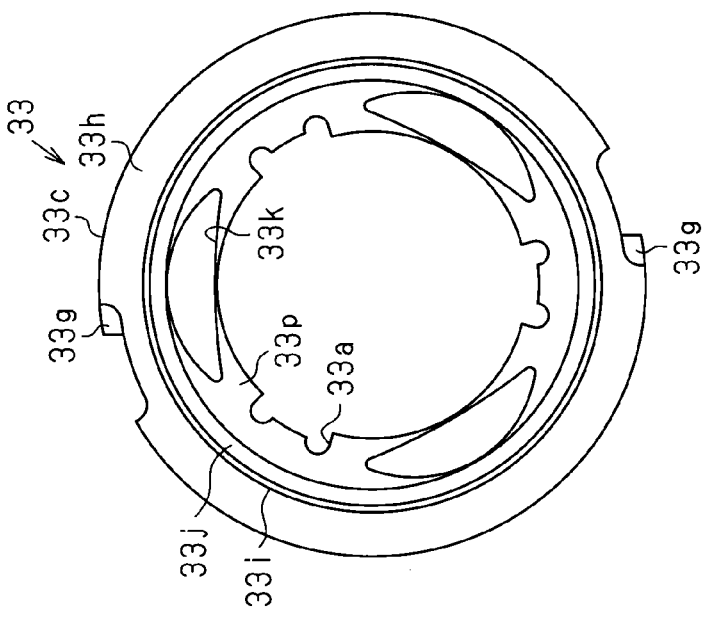
FIG. 12B is a plan view showing the braking member illustrated in FIG. 12A as viewed from the side corresponding to the rotary shaft.
Figure 12C:
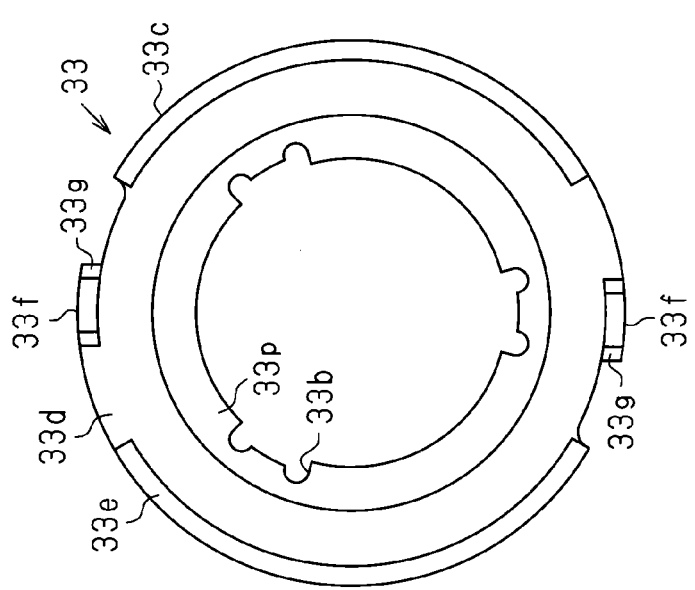
FIG. 12C is a cross-sectional view showing a portion of the braking member illustrated in FIG. 12A.

FIGS. 10A to 10C illustrate the first rotor 31 of the second embodiment. The hatched area of FIG. 10A shows a portion of the first rotor 31 that is formed of elastomer, as viewed from above. In the second embodiment, a metal plate P is formed in the cylindrical portion 31a through insert molding. The plate P includes a plurality of projections Pa projecting in radial directions of the cylindrical portion 31a. The projections Pa are spaced apart at equal circumferential intervals, extending in the circumferential direction of the cylindrical portion 31a. The plate P is fixed to the cylindrical portion 31a in such a manner that the distal portion of the rotary shaft 10 is passed through the plate P. The distal portion of the rotary shaft 10 and the fixing hole 31b each have a flat cross section.

A plurality of rotation transmitting portions Rc, which extend outward from the cylindrical portion 31a and along the axial direction, are formed in the portion of the first rotor 31 closer to the second rotor 32. The rotation transmitting portions Rc are spaced apart at equal circumferential intervals, extending in the circumferential direction. In the second embodiment, three rotation transmitting portions Rc are employed. An inner circumferential end of each one of the rotation transmitting portions Rc is covered by an elastomer member 36a serving as a buffer member. Each one of the elastomer members 36a, which covers the inner circumferential end of the corresponding one of the rotation transmitting portions Rc, has an expanded shape. The circumferential width of each elastomer member 36a is greater than the circumferential width of the portion of each rotation transmitting portion Rc that is not covered by the elastomer member 36a. Each elastomer member 36a is formed on the first rotor 31 through two-shot molding. An elastomer member is provided also on the distal surface of the cylindrical portion 31a closer to the second rotor 32 and a portion of the inner circumferential surface of the fixing hole 31b through two-shot molding. The elastomer members are provided continuously from the elastomer members 36a of the rotation transmitting portions Rc.

The flange portion 31c, which extends radially outward from the cylindrical portion 31a, is formed at the end of the first rotor 31 closer to the motor body 2. The flange portion 31c has an annular elastomer member 36b, which contacts the cylindrical portion 31a. The elastomer member 36b is provided continuously from the elastomer members 36a of the rotation transmitting portions Rc. The elastomer member 36b of the flange portion 31c is formed over a plurality of through holes K, each of which axially extends through the flange portion 31c. As shown in FIG. 10B, in each one of the through holes K that receives the corresponding one of the projections Pa of the plate P, the elastomer member 36b is provided only in the portion of the through hole K closer to the second rotor 32 than the projection Pa.

Cam grooves 31d, which face the movable friction member 33, are formed in the flange portion 31c at positions radially outward from the rotation transmitting portions Rc. The cam grooves 31d are spaced apart at equal circumferential intervals, extending along the circumferential direction. In the second embodiment, there are three cam grooves 31d. Each one of the cam grooves 31d extends in the circumferential direction of the flange portion 31c. The radial width of the cam groove 31d becomes smaller toward both circumferential ends of the cam groove 31d. The bottom surface of each cam groove 31d is curved in such a manner that the depth of the cam groove 31d is maximum at the circumferential center of the cam groove 31d and becomes gradually smaller toward each circumferential end.

With reference to FIGS. 9A, 11A, 11B, and 11C, the second rotor 32 has the cylindrical portion 32a, which is provided in the radially middle portion of the second rotor 32 and extends axially. A fixing hole 32b, to which the worm shaft 22 is fixed, is formed in the cylindrical portion 32a. A plurality of extended portions 32s extending radially from the center of the cylindrical portion 32a are provided at the distal portion of the cylindrical portion 32a, which is closer to the motor body 2. The extended portions 32s are spaced apart at equal circumferential intervals, extending in the circumferential direction. In the second embodiment, three extended portions 32s are provided. An engagement portion 32d, which axially projects, is formed on each one of the extended portions 32s. Contact recesses 32e are formed in both circumferential side surfaces of the radial inner end of each one of the engagement portions 32d. Each engagement portion 32d is shaped in such a manner that the circumferential width of the radial inner side of the engagement portion 32d is slightly smaller than the circumferential width of the radial outer side of the engagement portion 32d. With reference to FIG. 9A, the cylindrical portion 31a of the first rotor 31 is inserted at a position radially inward of the engagement portions 32d. Each one of the rotation transmitting portions Rc of the first rotor 31 is arranged between the corresponding pair of the engagement portions 32d of the second rotor 32. In other words, the rotation transmitting portions Rc of the first rotor 31 and the engagement portions 32d of the second rotor 32 are arranged alternately in the circumferential direction.

A plurality of spring support portions 32c, each of which has an opening facing the first rotor 31, are formed in an outer circumferential portion of the cylindrical portion 32a of the second rotor 32. Each one of the spring support portions 32c includes a bottom 32g extending radially outward and a pair of side walls 32h extending axially from the outer circumferential ends of the bottom 32g toward the rotary shaft 10. The side walls 32h are symmetric with respect to the center of the second rotor 32. One of the circumferential ends of each side wall 32h forms a projecting end 32i, which projects radially outward.

A driven side locking portion 32j, which is extended from the outer circumferential end of the bottom 32g in the same direction as each side wall 32h, is formed between the circumferential ends of each side wall 32h. An engagement projection 32k projecting in the circumferential direction of the second rotor 32 (toward the corresponding projecting end 32i) is formed at the distal end of each of the driven side locking portions 32j. The driven side locking portions 32j are symmetric with respect to the center of the second rotor 32. The driven side locking portions 32j project radially outward of the spring support portions 32c. The projection amount of each driven side locking portion 32j is substantially equal to the projection amount of the projecting end 32i of each side wall 32h.

With reference to FIGS. 9A, 12A, 12B, and 12C, the movable friction member 33 has a substantially cylindrical shape. A plurality of engagement grooves 33a, which extend axially, are formed in an inner circumferential surface of a cylindrical portion 33p of the movable friction member 33. The engagement grooves 33a are spaced apart at equal circumferential intervals, extending in the circumferential direction of the movable friction member 33. In the second embodiment, three engagement grooves 33a are employed. The engagement portions 32d of the second rotor 32 are each received in the corresponding engagement groove 33a, thus prohibiting the second rotor 32 from moving circumferentially in a manner relative to the movable friction member 33. In other words, the movable friction member 33 is allowed to rotate integrally with the second rotor 32 and move axially.

Figure 13:
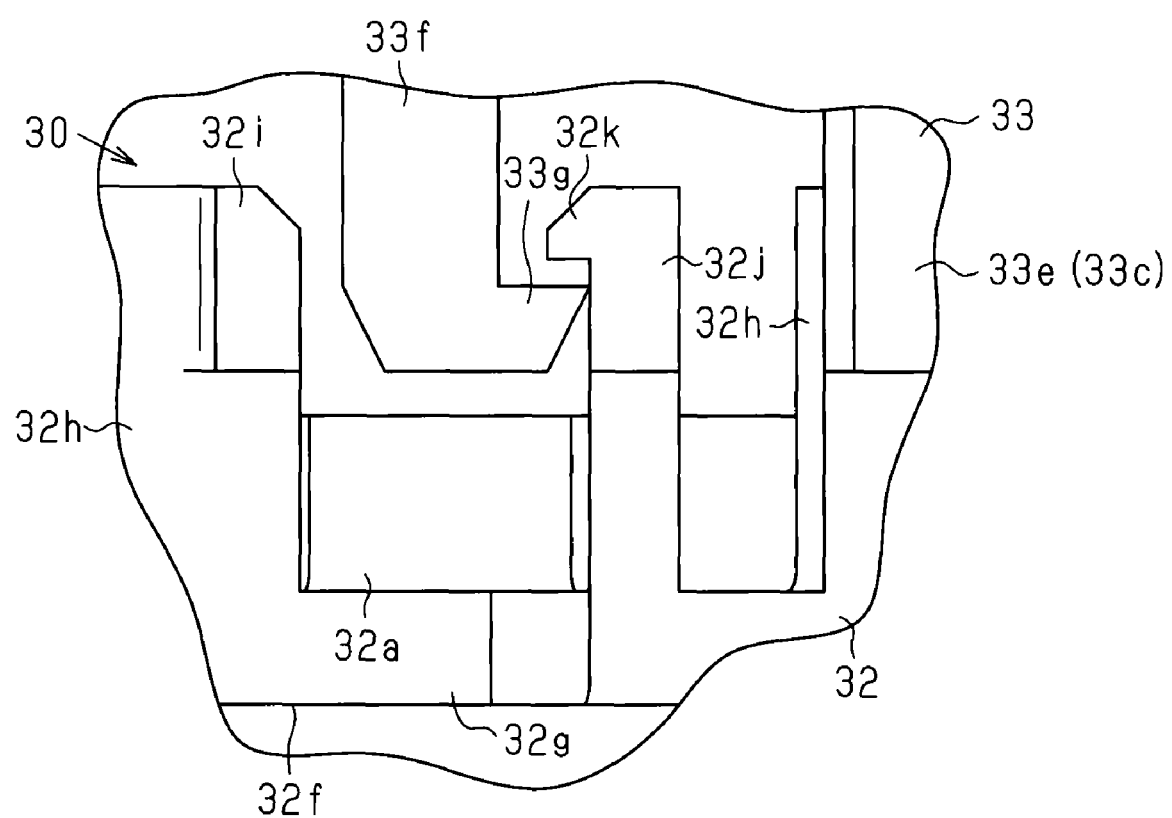
FIG. 13 is an enlarged side view showing a portion of the brake device illustrated in FIG. 12A.
Figure 14A:
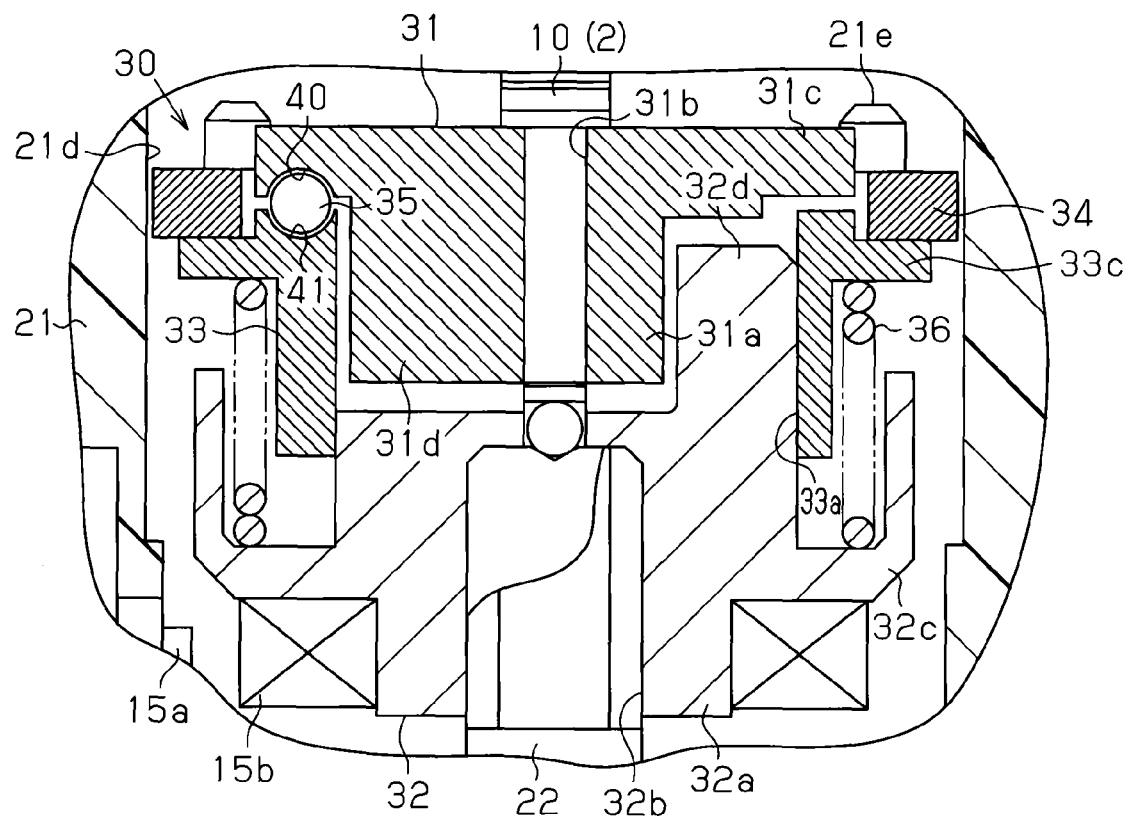
FIG. 14A is a cross-sectional side view showing a brake device of a motor according to a third embodiment of the present invention.
Figure 14B:
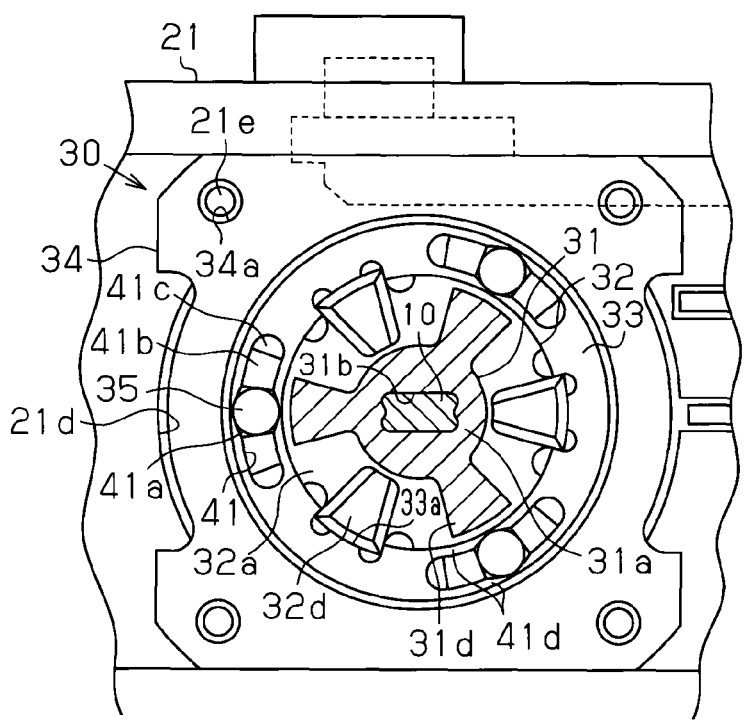
FIG. 14B is a cross-sectional plan view showing the brake device illustrated in FIG. 14A.
Figure 15A:
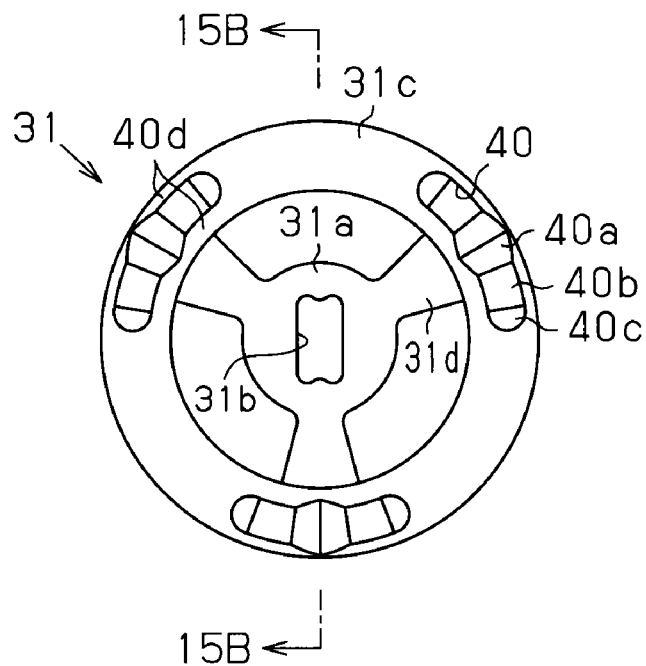
FIG. 15A is a plan view showing a first rotor of the motor illustrated in FIG. 14A as viewed from the side corresponding to a worm shaft.
Figure 15B:
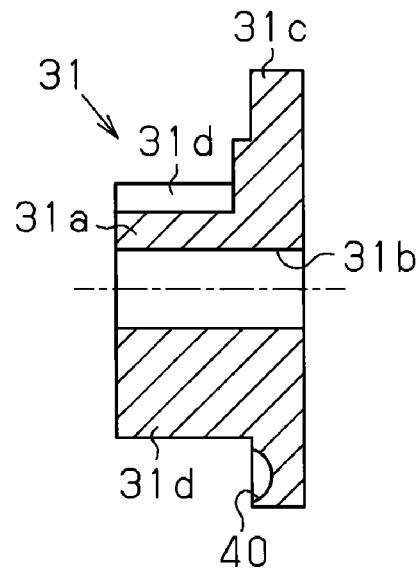
FIG. 15B is a cross-sectional view taken along line 15B-15B of FIG. 15A, showing the first rotor illustrated in FIG. 15A.
Figure 15C:
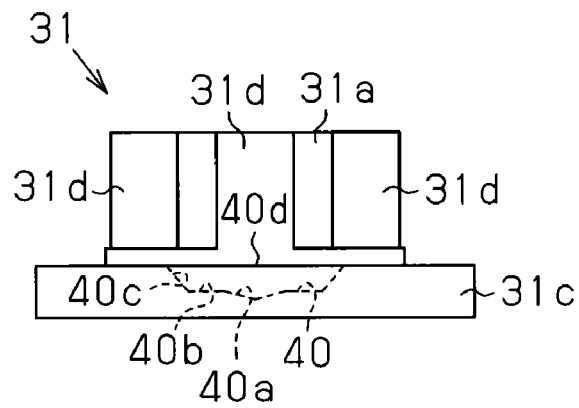
FIG. 15C is a front view showing the first rotor illustrated in FIG. 15A.
Figure 16A:
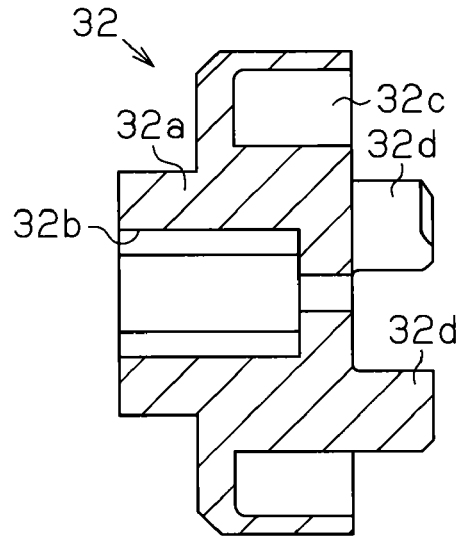
FIG. 16A is a cross-sectional view showing a second rotor of the motor illustrated in FIG. 14A.
Figure 16B:
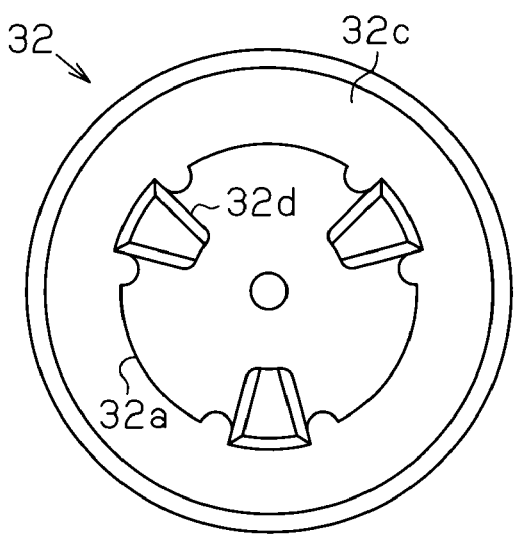
FIG. 16B is a plan view showing the second rotor illustrated in FIG. 16A as viewed from the side corresponding to a rotary shaft.

A plurality of pressing contact portions 33c, each of which has an opening in the second rotor 32, are formed in the distal surface of the movable friction member 33 closer to the motor body 2. Each one of the pressing contact portions 33c includes a bottom 33d extending radially outward from the outer circumferential surface of the cylindrical portion 33p and a pair of side walls 33e extending axially from the outer circumferential end of the bottom 33d toward the worm shaft 22. The diameter of each pressing contact portion 33c of the movable friction member 33 is slightly greater than the diameter of each spring support portion 32c of the second rotor 32. The pressing contact portions 33c of the movable friction member 33 are located at the side corresponding to the outer circumferences of the spring support portions 32c of the second rotor 32. A brake side locking portion 33f, which extends from the outer circumferential end of the bottom 33d in the same direction as each side wall 33e, is provided between the circumferential ends of each side wall 33e. As illustrated in FIG. 13, an engagement projection 33g projecting in the circumferential direction of the movable friction member 33 is formed at the distal end of each of the brake side locking portions 33f. The brake side locking portions 33f are symmetric with respect to the center of the movable friction member 33. Each one of the engagement projections 33g is axially lockable to the corresponding one of the engagement projections 32k of the second rotor 32. In the brake device 30 of the second embodiment, the driven side locking portions 32j of the second rotor 32 and the brake side locking portions 33f of the movable friction member 33 configure a second locking member.

As illustrated in FIG. 9A, a spring 36 serving as an urging member is arranged between the spring support portions 32c of the second rotor 32 and the pressing contact portions 33c of the movable friction member 33 in a compressed state. The proximal portion of the spring 36 is held in contact with the bottom 32g of each spring support portion 32c, and the distal portion of the spring 36 is held in contact with the bottom 33d of each pressing contact portion 33c. The spring 36 thus axially urges the movable friction member 33 toward the motor body 2.

With reference to FIGS. 9A and 12A to 12C, an annular braking surface 33h is formed on the end surfaces of the pressing contact portions 33c of the movable friction member 33 closer to the motor body 2. The braking surface 33h is provided at the outer circumferential ends of the bottoms 33d of the pressing contact portions 33c continuously from the side walls 33e of the pressing contact portions 33c. The braking surface 33h is a sloped surface having a diameter that becomes smaller toward the motor body 2. The inclination angle of the braking surface 33h is 45° with respect to the axis.

Figure 9B:
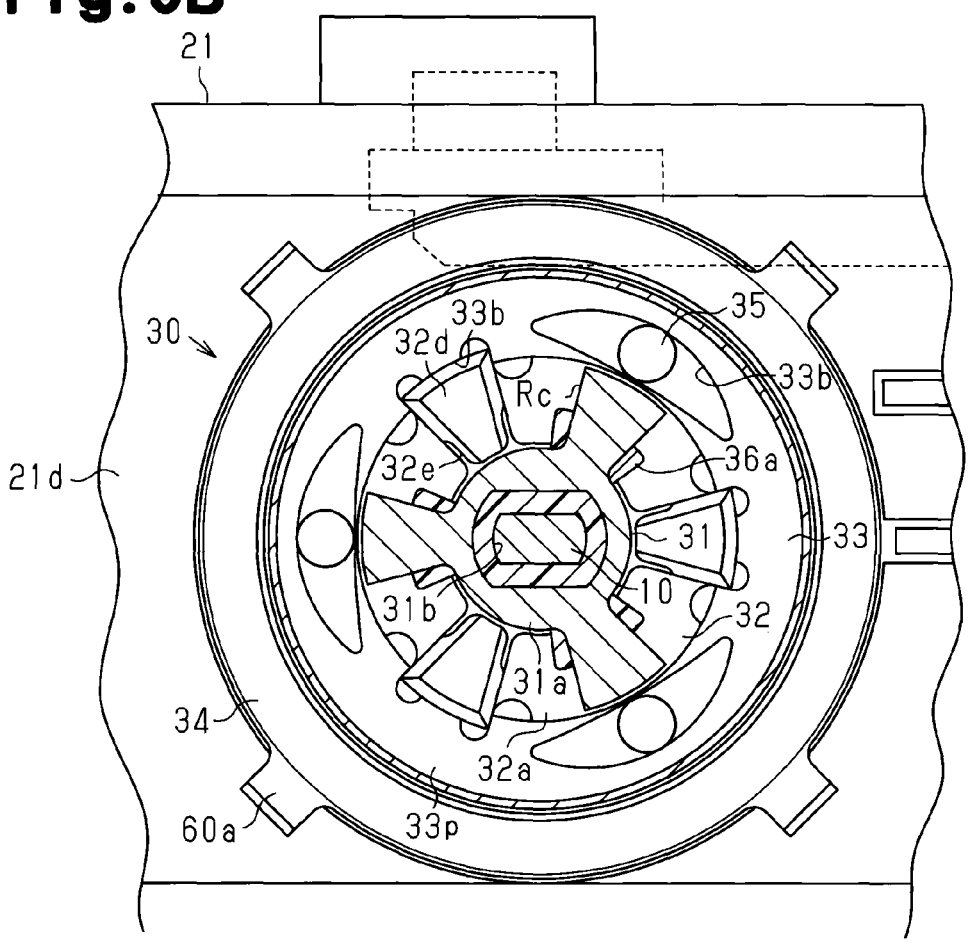
FIG. 9B is a cross-sectional plan view showing the brake device illustrated in FIG. 9A.

As illustrated in FIGS. 9A and 9B, the braking surface 33h is capable of contacting the annular fixed friction member (fixed friction portion) 34, which is fixed to the inner wall of the brake accommodating recess 21d of the gear housing 21. The fixed friction member 34 is formed of metal and has a tapered shape. Four fixing pieces 60a are formed in the fixed friction member 34 and spaced apart at equal circumferential intervals, extending in the circumferential direction. The fixing pieces 60a fix the fixed friction member 34 to the brake accommodating recess 21d. A friction surface 60b, which contacts the movable friction member 33, is inclined at 45° with respect to the axis in the same manner as the braking surface 33h, thus generating great friction force between the friction surface 60b and the braking surface 33h. The friction surface 60b is subjected to shot peening so as to have asperities. This facilitates generation of the friction force between the friction surface 60b and the braking surface 33h. In the second embodiment, the movable friction member 33, the fixed friction member 34, and the spring 36 form a braking mechanism.

With reference to FIGS. 9A, 9B, and 12A to 12C, an annular locking portion 33i serving as a first locking member, which extends axially from the inner circumferential end of the braking surface 33h toward the motor body 2, is formed continuously from the end of the movable friction member 33 closer to the motor body 2. A locking projection 33j projecting radially inward is formed at the distal end of the annular locking portion 33i. As illustrated in FIGS. 9A and 9B, the flange portion 31c of the first rotor 31 is arranged at the side corresponding to the inner circumference of the annular locking portion 33i. The locking projection 33j of the annular locking portion 33i is lockable to the circumferential end of the flange portion 31c.

[Operation of Brake Device 30]

In the brake device 30, when the motor body 2 is not in operation, or the first rotor 31 does not receive rotational force, the cam grooves 31d of the first rotor 31 are located at a position facing the cam grooves 33b of the movable friction member 33 and the spherical bodies 35 are each arranged at the circumferential centers of the corresponding cam groove 31d and the associated cam groove 33b. The movable friction member 33 is urged by the spring 36 to be pressed against and held in contact with the friction surface 60b of the fixed friction member 34. In other words, the movable friction member 33 is located at the engagement position at which the movable friction member 33 is engaged with the fixed friction member 34 in such a manner as to prohibit rotation of the movable friction member 33 relative to the fixed friction member 34. In this state, the friction force produced between the braking surface 33h of the movable friction member 33 and the friction surface 60b of the fixed friction member 34 prohibits the movable friction member 33 and the second rotor 32 from rotating relative to the fixed friction member 34. This prevents the worm shaft 22, the worm wheel 23, and the output shaft 24 from rotating. The window glass is thus prevented from falling or being opened by a person with malicious intention, preventing a car theft case.

Contrastingly, as the motor body 2 is driven to rotate the first rotor 31, the cam grooves 31d of the first rotor 31 move offset from the cam grooves 33b of the movable friction member 33 in the rotational direction of the first rotor 31. At this stage, each spherical body 35 rolls and relatively moves toward one of the circumferential ends of the corresponding one of the cam grooves 31d, 33b. This projects the spherical body 35 from the cam groove 31d of the first rotor 31 axially toward the movable friction member 33. The braking surface 33h thus presses the movable friction member 33 against the urging force of the spring 36. This separates the movable friction member 33 from the friction surface 60b of the fixed friction member 34 and the movable friction member 33 is switched to the non-engagement position at which the movable friction member 33 is prohibited from rotating relative to the fixed friction member 34. In this non-engagement state of the movable friction member 33, each one of the elastomer members 36a of the rotation transmitting portions Rc (the first rotor 31) contacts the contact recess 32e of the adjacent one of the engagement portions 32d (the second rotor 32) in the circumferential direction of the first rotor 31. This permits transmission of the rotational force of the first rotor 31 to the second rotor 32 so that the first rotor 31 and the second rotor 32 rotate integrally with each other. Specifically, the rotation transmitting portions Rc contact the contact recesses 32e of the second rotor 32 through the elastomer members 36a. This suppresses impact caused by contact between the rotation transmitting portions Rc and the contact recesses 32e or separation of the rotation transmitting portions Rc from the contact recesses 32e.

[Mounting of Brake Device 30]

To mount the brake device 30 in the motor 1, the components of the brake device 30 are assembled together to form a unit. The unit, or the brake device 30, is then mounted in the motor 1. Specifically, to form the brake device 30 as a unit, the spring 36 is arranged in the spring support portions 32c of the second rotor 32. The cylindrical portion 32a of the second rotor 32 is then inserted into the cylindrical portion 33p of the movable friction member 33 and the engagement projections 32k of the second rotor 32 are engaged with the corresponding engagement projections 33g of the movable friction member 33 (see FIG. 13). This prevents the movable friction member 33 from separating from the second rotor 32. The spring 36 urges the second rotor 32 and the movable friction member 33 in the direction in which the second rotor 32 and the movable friction member 33 are spaced from each other. This maintains locking the engagement projections 32k and the engagement projections 33g to each other.

The first rotor 31 is received in the annular locking portion 33i of the movable friction member 33 in which the spherical bodies 35 are arranged in the cam grooves 33b. The rotation transmitting portions Rc are arranged between the corresponding pair of the engagement portions 32d of the second rotor 32. To insert the first rotor 31 into the movable friction member 33, the annular locking portion 33i is once bent toward the side corresponding to the outer circumference by the flange portion 31c of the first rotor 31. The annular locking portion 33i then elastically restores its original shape after the flange portion 31c moves past the annular locking portion 33i. Since the outer circumferential surface of the locking projection 33j of the annular locking portion 33i is inclined, the first rotor 31 is easily inserted. After elastic shape restoration of the annular locking portion 33i, the locking projection 33j is located above the flange portion 31c so that the first rotor 31 is not separated from the movable friction member 33. As has been described, the brake device 30 is provided as a unit by assembling the first rotor 31 and the second rotor 32 with the movable friction member 33 in an inseparable manner.

To mount the brake device 30 provided as a unit in the motor 1, the brake device 30 is accommodated in the brake accommodating recess 21d of the gear housing 21, and the worm shaft 22 is fixed to the second rotor 32. The fixed friction member 34 is then mounted on the braking surface 33h of the movable friction member 33. The movable friction member 33 is pressed and moved toward the second rotor 32 against the urging force of the springs 36 by means of the fixed friction member 34. The fixed friction member 34 is then fixed to the brake accommodating recess 21d. This arranges the movable friction member 33 at the engagement position. Further, a clearance that allows axial movement of the movable friction member 33 is provided between each engagement projection 32k of the second rotor 32 and the corresponding engagement projection 33g of the movable friction member 33.

Afterwards, the rotary shaft 10 of the motor body 2 is fixed to the first rotor 31 and a clearance that allows axial movement of the movable friction member 33 is defined also between the flange portion 31c of the first rotor 31 and the locking projection 33j of the movable friction member 33. This allows the movable friction member 33 to move between the two positions, or the engagement position and the non-engagement position. In this manner, the brake device 30 is assembled with the motor body 2 and the speed reducing portion 3 and thus the motor 1 is completed.

The second embodiment has the following advantages.

(1) In the second embodiment, the annular locking portion 33i, or the first locking member, is arranged between the first rotor 31 and the movable friction member 33 in such a manner that the first rotor 31 is inseparably engaged with the movable friction member 33. Also, the driven side locking portions 32j and the brake side locking portions 33f are provided between the second rotor 32 and the movable friction member 33 in such a manner that the second rotor 32 is inseparably engaged with the movable friction member 33. The driven side locking portions 32j and the brake side locking portions 33f each configure the second locking member. This enables mounting of the brake device 30 in the motor 1 after the brake device 30 is provided as a unit. The brake device 30 is thus easily mounted in the motor 1. Also, since the brake device 30 is manufactured in a continuous manner, production efficiency is improved.

(2) In the second embodiment, the second locking members are formed by the driven side locking portions 32j, which are extended axially from the second rotor 32 toward the rotary shaft 10, and the brake side locking portions 33f, which are extended axially from the movable friction member 33 toward the worm shaft 22. The driven side locking portions 32j and the corresponding brake side locking portions 33f are locked to each other in the axial direction. This prevents the second rotor 32 and the movable friction member 33 from separating from each other.

(3) In the second embodiment, the elastomer members 36a, or the buffer members, are arranged between the rotation transmitting portions Rc and the engagement portions 32d in the rotational direction. This suppresses impact produced between each rotation transmitting portion Rc and the corresponding engagement portion 32d in, for example, transmission of rotational force. Further, since the elastomer members 36a are provided in the brake device 30 as the buffer members, the elastomer members 36a are located in a portion prior to speed reduction by the speed reducing portion 3. As a result, compared with the case in which a buffer member is arranged in a portion after speed reduction and absorbs great rotational force after speed reduction, each of the buffer members becomes compact, thus reducing the size of the motor 1.

(4) In the second embodiment, the elastomer members 36a are formed integrally with the rotation transmitting portions Rc. As a result, compared with the case in which the buffer members are provided as independent components, the number of the components decreases and mounting of the brake device 30 is facilitated.

A third embodiment of the present invention will hereafter be explained with reference to FIGS. 14A to 18C. In the third embodiment, the configuration of the brake device 30 is different from that of the first embodiment. Same or like reference numerals are given to components of the third embodiment that are the same as or like corresponding components of the first embodiment. Explanation of these components will be omitted.

[Configuration of Brake Device]

Figure 17A:
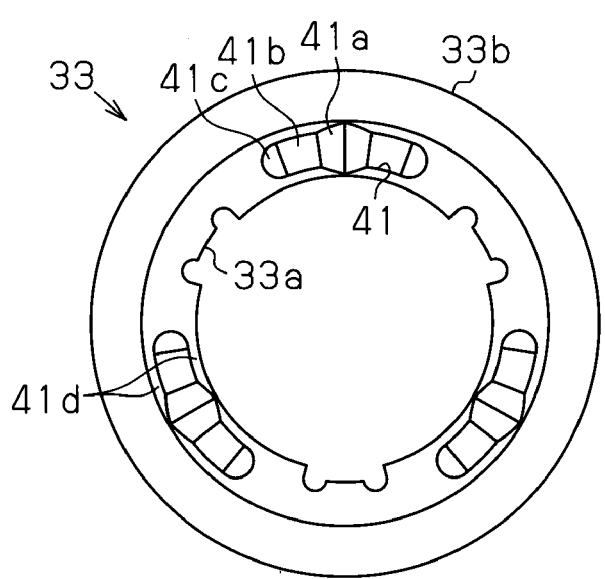
FIG. 17A is a plan view showing a braking member of the motor illustrated in FIG. 14A as viewed from the side corresponding to the rotary shaft.
Figure 17B:
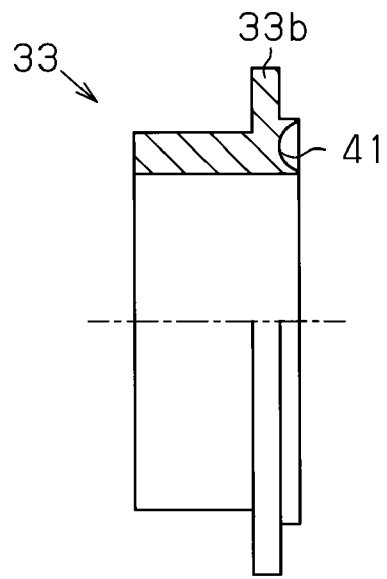
FIG. 17B is a cross-sectional view showing a portion of the braking member illustrated in FIG. 17A.

In the third embodiment, the cam grooves 31d formed in the first rotor 31 will be referred to as cam grooves 40 and the cam grooves 33b of the movable friction member 33 will be referred to as cam grooves 41. The cam grooves 40 and the cam grooves 41 are shaped as will be explained. Since the cam grooves 40 and the cam grooves 41 are shaped identically, the following explanation is focused on the cam grooves 41 and detailed description of the cam grooves 40 is omitted. As illustrated in FIG. 17B, each of the cam grooves 41 has an arcuate shape extending along the circumferential direction of the movable friction member 33. A first sloped portion 41a, a holding portion 41b, and a second sloped portion 41c are formed on the bottom of each cam groove 41 in this order from the circumferential center of the cam groove 41 toward each one of the circumferential ends and in a continuous manner. Each cam groove 41 are formed by sections shaped in a line symmetrical manner with respect to a line extending in a radial direction of the first rotor 31 and on the circumferential center of the cam groove 41. Specifically, one first sloped portion 41a, one holding portion 41b, and one second sloped portion 41c are arranged at each side of the circumferential center of the cam groove 41. The depth of each cam groove 41 is maximum at the circumferential center.

Figure 18A:
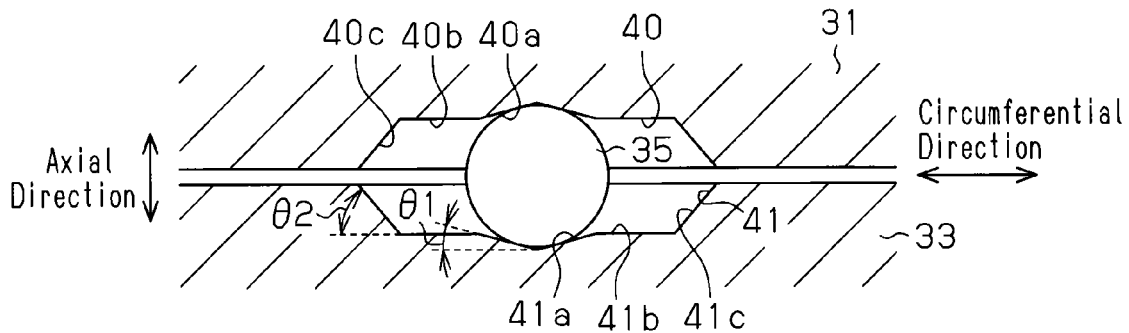
FIGS. 18A to 18C are cross-sectional views each schematically illustrating operation of a cam mechanism of the motor illustrated in FIG. 14A.

With reference to FIG. 18A, each one of the first sloped portions 41a of each cam groove 41 is sloped in such a manner that the depth of the first sloped portion 41a becomes smaller from the circumferential center of the cam groove 41 toward the corresponding one of the circumferential ends. The inclination angle θ1 of each first sloped portion 41a is set to a value smaller than 45 degrees. The radial width of each first sloped portion 41a becomes gradually smaller toward the corresponding circumferential end. Each one of the holding portions 41b, which extends from the corresponding one of the first sloped portions 41a, extends parallel with a plane perpendicular to the axial direction of the movable friction member 33. In other words, the depth of each holding portion 41b is uniform along the circumferential direction of the holding portion 41b. As has been described, each holding portion 41b (each cam groove 41) has an arcuate axial cross section and thus the depth of the holding portion 41b varies from one radial position to another. The radial width of each holding portion 41b is uniform in the circumferential direction of the holding portion 41b. Each one of the second sloped portions 41c, which extends continuously from the corresponding one of the holding portions 41b, is sloped in such a manner that the depth of the second sloped portion 41c becomes smaller toward the corresponding one of the circumferential ends of the cam groove 41. The inclination angle θ2 of each second sloped portion 41c with respect to the circumferential direction is set to a value greater than or equal to 45 degrees. Each cam groove 41 is capable of receiving a substantial half of the corresponding spherical body 35 at a valley portion formed between the two first sloped portions 41a at the circumferential center of the cam groove 41. Each of the cam grooves 40, which are shaped and sized identically with the cam grooves 41, includes first sloped portions 40a, holding portions 40b, and second sloped portions 40c like the first sloped portions 41a, the holding portions 41b, and the second sloped portions 41c.

In this cam mechanism, when the motor body 2 is not in operation, or the first rotor 31 does not receive rotational force, each cam groove 40 is located at a position facing the corresponding cam groove 41 with the spherical body 35 arranged at the circumferential centers of the cam grooves 40, 41. The cam grooves 40 and the cam grooves 41 extend circumferentially and, as illustrated in FIG. 17A, a side wall 40d and a side wall 41d are formed at opposite axial sides of each cam groove 40. This arrangement prevents each spherical body 35 from separating from the corresponding cam groove 40. If the motor body 2 is actuated in this state, the first rotor 31 rotates together with the rotary shaft 10 of the motor body 2. In this state, the second rotor 32 and the movable friction member 33 are maintained stopped by the load produced by the worm shaft 22, which is engaged with the worm wheel 23. The cam grooves 40 thus move offset from the cam grooves 41 in the rotational direction. At this stage, each spherical body 35 rolls in the rotational direction of the first rotor 31 in such a manner that the spherical body 35 is clamped between one of the first sloped portions 40a of the associated cam groove 40 and the corresponding one of the first sloped portions 41a of the cam groove 41. This projects each spherical body 35 axially from the corresponding cam groove 40 toward the movable friction member 33. The spherical bodies 35 then press the corresponding first sloped portions 41a of the associated cam grooves 41 against the worm shaft 22, thus separating the fixed friction member 34 from the first rotor 31. The cam grooves 41 and the cam grooves 40 are each shaped in a line symmetrical manner with respect to the radial line extending on the circumferential center of the cam groove 40, 41. In this manner, each cam groove 41 and the corresponding cam groove 40 are each allowed to operate in correspondence with both of the rotational directions of the first rotor 31.

[Operation of Brake Device 30]

In this brake device 30, when the motor body 2 is not in operation, or the first rotor 31 does not receive rotational force, each cam groove 40 and the corresponding cam groove 41 are located at axially opposed positions, as illustrated in FIG. 18A. The associated spherical body 35 is located at the circumferential center of the cam groove 40 and that of the cam groove 41. At this stage, the urging force of the spring 36 is applied to the movable friction member 33 so that the pressing contact portion 33c of the movable friction member 33 is pressed against and held in contact with the fixed friction member 34. In other words, the movable friction member 33 is located at the engagement position at which the movable friction member 33 is engaged with the fixed friction member 34 in the rotational direction. In this state, the friction force produced between the pressing contact portion 33c of the movable friction member 33 and the fixed friction member 34 prohibits the movable friction member 33 and the second rotor 32 from rotating relative to the fixed friction member 34. This prevents the worm shaft 22, the worm wheel 23, and the output shaft 24 from rotating, thus stopping the window glass from falling or being opened by a person with malicious intention so that a car theft case is prevented.

Contrastingly, as the motor body 2 is driven to provide rotational force to the first rotor 31, the first sloped portions 40a of each cam groove 40 move relative to the first sloped portions 41a of the corresponding cam groove 41 in the circumferential direction of the first rotor 31, as has been described. This causes each spherical body 35 to press the movable friction member 33 against the worm shaft 22 against the urging force of the spring 36. The pressing contact portion 33c of the movable friction member 33 thus separates from the fixed friction member 34. In other words, the movable friction member 33 is moved to the non-engagement position at which the movable friction member 33 is prohibited from rotating relative to the fixed friction member 34, or switched to a brake releasing state. The inclination angle θ1 of each first sloped portion 40a, 41a is smaller than 45 degrees, as has been described. This allows easy movement of the movable friction member 33 to the non-engagement position against the urging force of the spring 36.

Figure 18B:
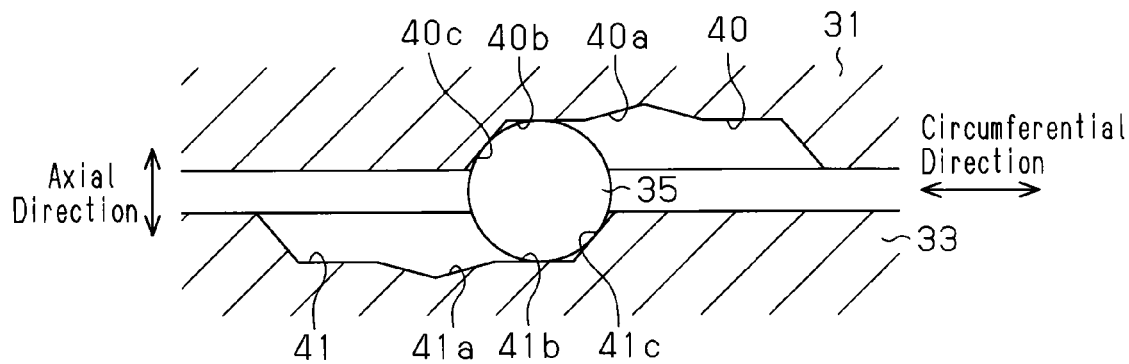
Figure 18C:
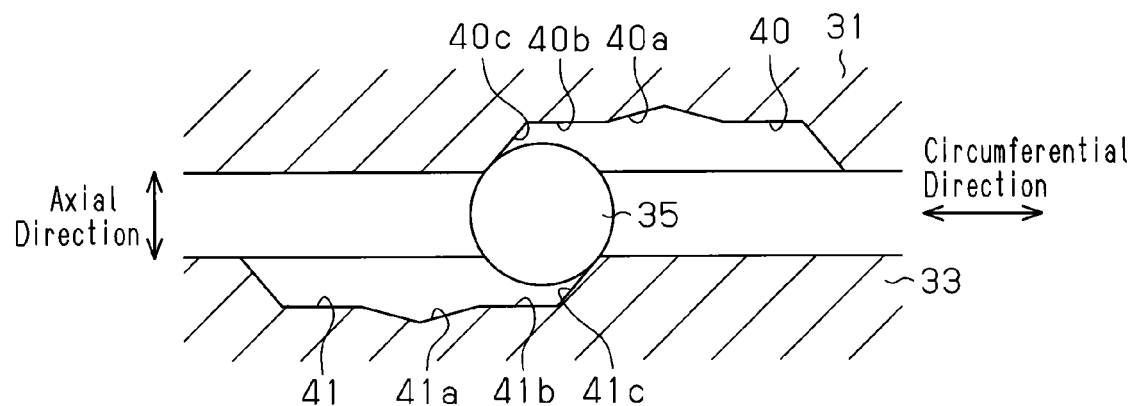

Afterwards, with reference to FIG. 18B, each cam groove 40 moves offset from the corresponding cam groove 41 along the rotational direction of the first rotor 31 so that the associated spherical body 35 is clamped between the holding portion 40b of the cam groove 40 and the holding portion 41b of the cam groove 41. With the spherical body 35 arranged between the holding portions 40b, 41b in the axial direction, the movable friction member 33 is not moved axially and thus the distance between the pressing contact portion 33c of the movable friction member 33 and the fixed friction member 34 is maintained constant. As the first rotor 31 continues to rotate, the cam groove 40 moves in the rotational direction while rolling the spherical body 35 in a state clamped between the second sloped portion 40c of the cam groove 40 and the second sloped portion 41c of the cam groove 41, as illustrated in FIG. 18C. This further projects the spherical bodies 35 axially from the corresponding cam grooves 40, thus further separating the pressing contact portion 33c of the movable friction member 33 from the first rotor 31.

With each spherical body 35 arranged between the second sloped portion 40c and the second sloped portion 41c, each rotation transmitting portion Rc of the first rotor 31 contacts the corresponding engagement portion 32d of the second rotor 32 in the rotational direction. This permits transmission of the rotational force of the first rotor 31 to the second rotor 32 so that the first rotor 31 and the second rotor 32 rotate integrally with each other. As the second rotor 32 rotates, the output shaft 24 rotates through the worm shaft 22 and the worm wheel 23. Rotation of the output shaft 24 activates the window regulator to selectively open and close the window glass.

If the motor body 2 is deactivated to stop rotation of the first rotor 31 when the first rotor 31 and the second rotor 32 rotate integrally with each other, the urging force of the spring 36 that urges the movable friction member 33 toward the first rotor 31 moves the movable friction member 33 closer to the first rotor 31. At this stage, each spherical body 35 rolls along the corresponding second sloped portions 40c, 41c toward the holding portions 40b, 41b while pressing the second sloped portion 40c of the cam groove 40. The first rotor 31 is thus rotated in a returning direction. This returns the first rotor 31 to the position at which the first rotor 31 is located at the same circumferential position as the cam groove 41, with reference to FIG. 18A. That is, the movable friction member 33 is returned to the engagement position with respect to the fixed friction member 34. When each spherical body 35 is axially clamped between the holding portions 40b, 41b, the urging force of the spring 36 is not converted into the rotational force acting in the direction in which the first rotor 31 is returned. The first rotor 31 thus rotates to the returned position using the rotational force obtained from the second sloped portions 40c, 41c. In the third embodiment, since the inclination angle θ2 of each second sloped portion 40c, 41c is set to a value greater than or equal to 45 degrees, the second sloped portions 40c, 41c efficiently produce the rotational force acting in the direction in which the first rotor 31 is returned. As a result, the first rotor 31 is reliably returned to the returned position.

In the brake device 30, if, for example, a quick and temporary drop of the drive force provided by the motor body 2 occurs after the brake has been released so that the first rotor 31 and the second rotor 32 rotate integrally with each other, the urging force of the spring 36 acts to roll the spherical bodies 35 on the second sloped portions 40c, 41c. As a result, the movable friction member 33 is moved closer to the fixed friction member 34. The movable friction member 33 then moves until the movable friction member 33 is switched to the state in which each spherical body 35 is axially clamped between the holding portions 40b, 41b, as illustrated in FIG. 18B. However, the holding portions 40b, 41b decrease the urging force that urges the movable friction member 33 in the direction in which the movable friction member 33 is returned to the engagement position. The brake releasing state is thus stably maintained. This suppresses erroneous operation such as generation of braking force through undesirable returning of the movable friction member 33 to the engagement position while the first and second rotors 31, 32 are rotating integrally. Also, when the motor body 2 is stopped, the movable friction member 33 is returned to the non-engagement position after the urging force that urges the movable friction member 33 in the direction in which the movable friction member 33 is returned to the engagement position is temporarily attenuated by the holding portions 40b, 41b. This causes the movable friction member 33 to smoothly contact the fixed friction member 34.

The third embodiment has the following advantages.

(1) In the motor 1 of the third embodiment, each cam groove 40 and the corresponding cam groove 41 each serving as a cam portion include the first sloped portions 40a, 41a, the holding portions 40b, 41b, and the second sloped portions 40c, 41c. The holding portions 40b, 41b maintain a constant interval between the movable friction member 33 and the fixed friction member 34. The second sloped portions 40c, 41c are inclined in the same directions as the first sloped portions 40a, 41a. Each first sloped portion 40a, 41a applies its operating force to the movable friction member 33 so that the movable friction member 33 is switched to the non-engagement position as the first rotor 31 rotates. Each holding portion 40b, 41b is formed continuously from the corresponding first sloped portion 40a, 41a in the circumferential direction. Each second sloped portion 40c, 41c is located opposite to the corresponding first sloped portion 40a, 41a with the holding portion 40b, 41b arranged between the first sloped portion 40a, 41a and the second sloped portion 40c, 41c. The second sloped portion 40c, 41c is sloped in the same direction as the first sloped portion 40a, 41a. Each sloped portion 40c, 41c is formed continuously from the corresponding holding portion 40b, 41b in the circumferential direction. As a result, when the rotational force is not provided from the rotary shaft 10 to the first rotor 31, the movable friction member 33 is arranged at the engagement position. When the rotational force is sent from the rotary shaft 10 to the first rotor 31, the first sloped portions 40a, 41a of the cam grooves 40, 41 move as the first rotor 31 rotates. This switches the movable friction member 33 to the non-engagement position, or the brake releasing state, allowing integral rotation of the first and second rotors 31, 32. In the brake releasing state, the force acting to return the movable friction member 33 to the engagement position, which is generated in the second sloped portions 40c, 41c by the urging force of the spring 36, is attenuated by the holding portions 40b, 41b, each of which is located between the first sloped portion 40a, 41a and the second sloped portion 40c, 41c and maintains a constant distance between the movable friction member 33 and the fixed friction member. This suppresses undesirable returning of the movable friction member 33 to the engagement position in the brake releasing state. This stably maintains the brake releasing state.

(2) In the third embodiment, the inclination angle θ2 of each second sloped portion 40c, 41c is greater than the inclination angle θ1 of each first sloped portion 40a, 41a. As a result, the inclination angle θ1 of the first sloped portion 40a, 41a, which operates to switch the movable friction member 33 to the non-engagement position, and the inclination angle θ2 of the second sloped portion 40c, 41c, which operates to return the fixed friction member 34 to the engagement position, are set to values suitable for the respective operating purposes.

(3) In the third embodiment, the inclination angle θ1 of the first sloped portion 40a, 41a is set to a value smaller than 45 degrees. The movable friction member 33 is thus easily switched to the non-engagement position through rotation of the first rotor 31. The inclination angle θ1 of the first sloped portion 40a, 41a is set to a value greater than or equal to 45 degrees. This increases the force that is generated through urging of the spring 36 to return the movable friction member 33 to the engagement position when the brake is released and the first and second rotors 31, 32, which rotate integrally with each other, stop receiving the rotational force from the rotary shaft 10. The movable friction member 33 is thus easily returned to the engagement position.

(4) In the third embodiment, each cam mechanism includes the spherical body 35, or a rolling body, a portion of which is received in the corresponding cam grooves 40, 41 between the first rotor 31 and the movable friction member 33. Accordingly, as the first rotor 31 rotates and the cam grooves 40 move in the rotational direction, each spherical body 35 relatively moves while rolling in the corresponding cam groove 40 and the associated cam groove 41 while pressing the movable friction member 33 against the urging force of the spring 36. This suppresses friction produced by movement of the cam grooves 40 in the rotational direction, thus ensuring smooth movement of the movable friction member 33.

(5) In the third embodiment, the first rotor 31 and the movable friction member 33 both have the cam grooves 40 or 41. The spherical bodies 35 are each arranged between the corresponding cam groove 40 and the associated cam groove 41. This ensures stable operation of each cam mechanism.

The illustrated embodiments of the present invention may be modified as follows.

Figure 19:
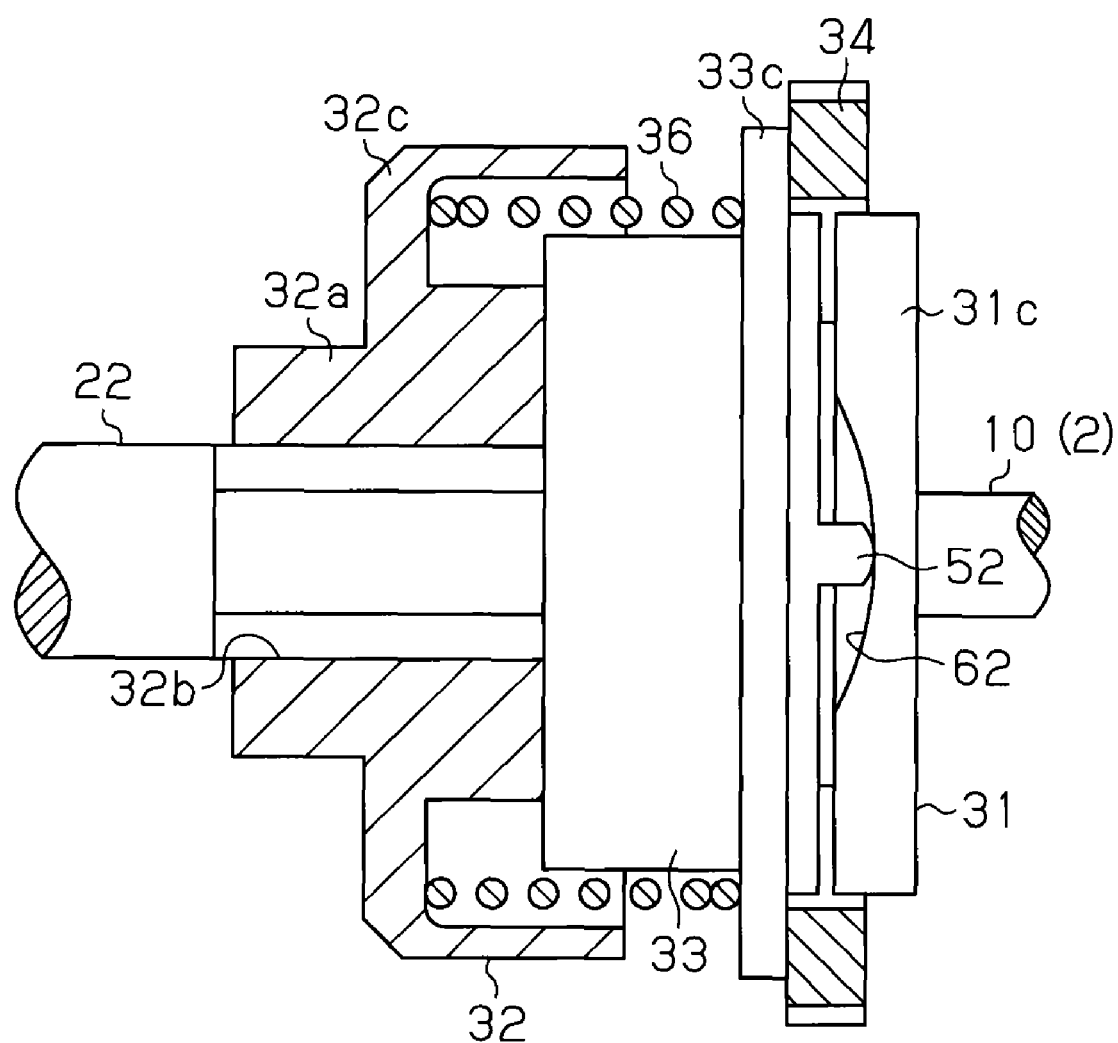
FIG. 19 is a cross-sectional side view showing a brake device according to a modification of the first embodiment.

Although each cam mechanism of the first and second embodiments includes the cam grooves 31d, 33b and the spherical body 35, the present invention is not restricted to this. For example, as illustrated in FIG. 19, the cam mechanism may include a plurality of recesses 62 and a plurality of projected portions 52. The recesses 62 are formed in the surface of the flange portion 31c of the first rotor 31 facing the movable friction member 33. The projected portions 52 project axially from the movable friction member 33. The bottom surface of each of the recesses 62 is curved. The distal end of each of the projected portions 52 projects toward the bottom surface of the corresponding recess 62. As the first rotor 31 rotates, each projected portion 52 receives the rotational force of the first rotor 31 from the bottom surface of the corresponding recess 62. This moves the movable friction member 33 toward the worm shaft 22 against the urging force and separates the movable friction member 33 from the fixed friction member 34. This structure eliminates the necessity to deploy a component such as the spherical body 35 between the first rotor 31 and the movable friction member 33, thus suppressing noise caused by vibration of the component. Alternatively, the recesses 62 may be provided in the movable friction member 33 and the projected portions 52 may be formed in the first rotor 31.

Figure 21:
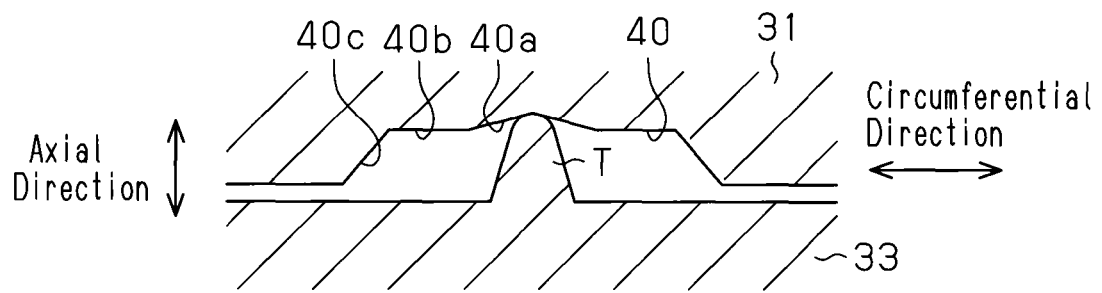
FIG. 21 is a cross-sectional side view showing a brake device according to a modification of the third embodiment.

Each cam mechanism may be configured without one of the cam groove 31d and the cam groove 33b. Further, the cam mechanism may be configured by a cam groove 31d and a projected portion T, which are illustrated in FIG. 21, instead of the spherical body 35. The projected portion T projects axially from the distal end of the movable friction member 33. The distal end of the projected portion T is capable of contacting the cam groove 31d. As the first rotor 31 rotates, the projected portion T receives rotational force from the bottom of the cam groove 31d. This moves the movable friction member 33 toward the worm shaft 22 against the urging force, thus separating the movable friction member 33 from the fixed friction member 34. This structure eliminates the necessity to provide a component such as the spherical body 35 between the first rotor 31 and the movable friction member 33, suppressing noise caused by vibration of the component. Alternatively, the projected portion T may be arranged in the first rotor 31 in such a manner that the projected portion T is engaged with the cam groove 33b.

Figure 20:
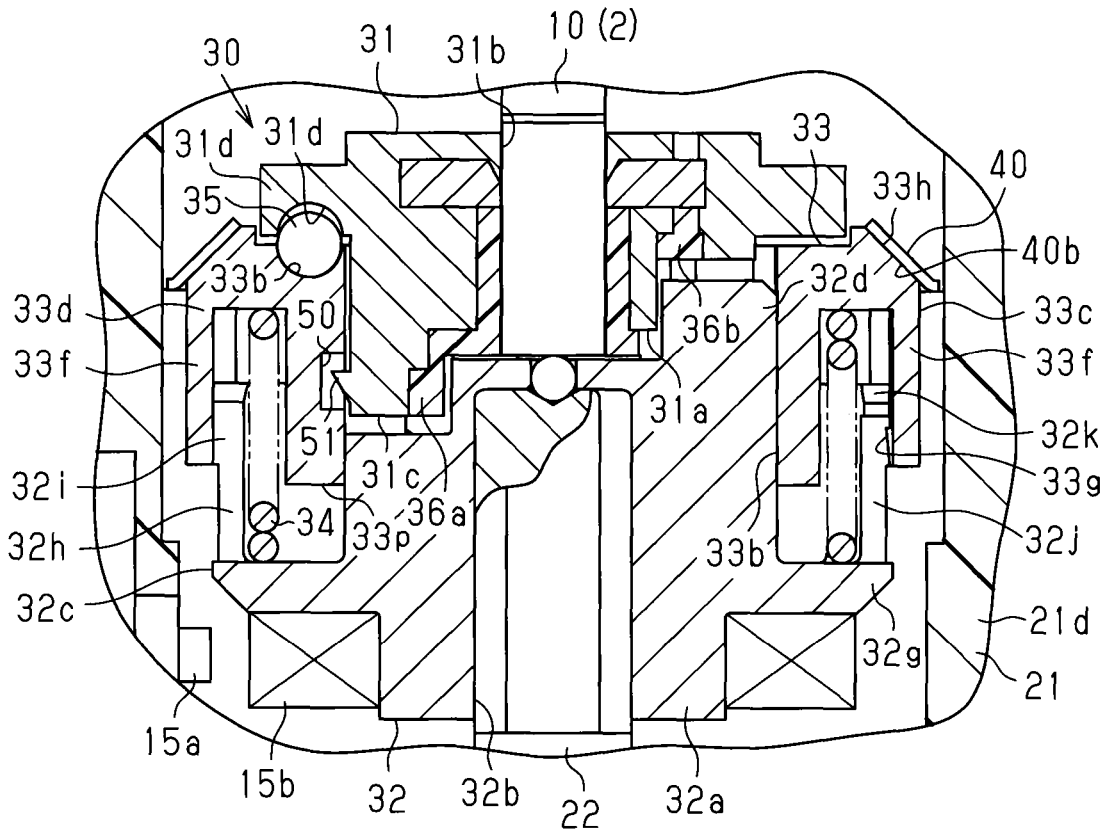
FIG. 20 is a cross-sectional view schematically showing a cam mechanism according to a modification of the second embodiment.

Although the annular locking portion 33i is used as each first locking member in the second embodiment, the present invention is not restricted to this. For example, as illustrated in FIG. 20, a locking groove 50 and a locking projection 51 may be employed. The locking groove 50 is formed in the inner circumferential surface of the cylindrical portion 32a of the movable friction member 33. The locking projection 51 projects from an end surface of each rotation transmitting portion Rc of the first rotor 31 at the side corresponding to the outer circumference. The locking groove 50 is formed continuously along the circumferential direction. The locking projection 51 projects radially outward. The locking projection 51 is located in the locking groove 50. The locking groove 50 and the locking projection 51 are lockable to each other in the axial direction. The locking groove 50 and the locking projection 51 prohibit the first rotor 31 from separating from the movable friction member 33. When the brake device 30 is in a mounted state, a clearance that permits axial movement of the movable friction member 33 is formed between the locking groove 50 and the locking projection 51. As a result, the first locking member is configured without enlarging the brake device 30 in the axial direction. Alternatively, as the first locking member, a locking member formed by an independent body may be employed.

In the second embodiment, the annular locking portion 33i is formed continuously along the circumferential direction. However, the annular locking portion 33i may be discontinuous at one section or divided into separate locking projections.

Although two driven side locking portions 32j and two brake side locking portions 33f are provided in the second embodiment, the present invention is not restricted to this. That is, one or three or more of the driven side locking portion(s) 32j and the brake side locking portion(s) 33f may be employed.

In the second embodiment, the engagement projections 32k of the second rotor 32 and the engagement projections 33g of the movable friction member 33 project circumferentially. However, the engagement projections 32k and the engagement projections 33g may project radially.

In the second embodiment, each second locking member is formed by the driven side locking portion 32j and the brake side locking portion 33f. However, the driven side locking portions 32j may be provided in the cylindrical portion 32a of the second rotor 32 and the brake side locking portions 33f may be formed in the cylindrical portion 33p of the movable friction member 33. Alternatively, as the second locking member, a locking member formed by a separate body may be provided.

In the second embodiment, the elastomer members 36a each serving as a buffer member are formed integrally with the rotation transmitting portions Rc of the first rotor 31. However, the elastomer members 36a may be formed integrally with the engagement portions 32d of the second rotor 32 or both the rotation transmitting portions Rc and the engagement portions 32d. Alternatively, each buffer member may be arranged between the corresponding rotation transmitting portion Rc and the associated engagement portion 32d as a separate body. Further, the elastomer members may be formed on at least either the entire side surface of the cylindrical portion 31a and the entire side surfaces of the rotation transmitting portions Rc of the first rotor 31 or the entire side surfaces of the engagement portions 32d of the second rotor 32 through outsert molding.

Although the elastomer members 36a are employed as the buffer members in the second embodiment, the present invention is not restricted to this.

In the third embodiment, the inclination angle θ1 of each first sloped portion 40a, 41a is set to a value smaller than 45 degrees and the inclination angle θ2 of each second sloped portion 40c, 41c is set to a value greater than or equal to 45 degrees. However, the present invention is not restricted to such setting. That is, the inclination angle θ1 of each first sloped portion 40a, 41a may be set to a value greater than or equal to 45 degrees and the inclination angle θ2 of each second sloped portion 40c, 41c may be set to a value smaller than 45 degrees.

Although each first sloped portion 40a, 41a and each second sloped portion 40c, 41c are formed in linear shapes, the present invention is not restricted to this. Specifically, the first sloped portions 40a, 41a and the second sloped portions 40c, 41c may be formed in curved shapes.

In the third embodiment, each cam groove 40, 41 is formed in such a shape that the two sections of the cam groove 40, 41 are arranged in a line symmetrical manner with respect to the radial direction of the first rotor 31 extending on the circumferential center of the cam groove 40, 41. Thus, each side of the circumferential center of each cam groove 40, 41 includes one first sloped portion 40a, 41a, one holding portion 40b, 41b, and one second sloped portion 40c, 41c. However, each cam groove 40, 41 may include one first sloped portion 40a, 41a, one holding portion 40b, 41b, and one second sloped portion 40c, 41c in correspondence with one of the rotational directions of the first rotor 31.

Although the side walls 40d, 41d are arranged at both radial sides of the corresponding cam groove 31d, 33b in the third embodiment, the present invention is not restricted to this. That is, the invention may be constituted without the side walls 40d, 41d.

In the first to third embodiments, three cam mechanisms (each including the cam grooves 31d, 33b, 40, 41 and the spherical body 35) are provided. However, the number of the cam mechanisms may be one, two, or four or more.

Although three engagement portions 31e, 32d are employed in the first to third embodiments, one, two, or four or more engagement portion(s) 31e, 32d may be used.

In the first to third embodiments, the engagement portions 31e, 32d are arranged radially inward of the cam mechanisms. However, the present invention is not restricted to this, and the engagement portions 31e, 32d and the cam mechanisms may be, for example, aligned in the circumferential direction. This arrangement decreases the radial dimension of the brake device, thus contributing to further reduction in the size of the brake device.

Although each engagement member includes the engagement portion 31e extending in the circumferential direction of the first rotor 31 and the engagement portion 32d extending in the circumferential direction of the second rotor 32 in the first to third embodiments, the present invention is not restricted to this. That is, for example, the invention may employ a structure involving engagement between an engagement recess formed in either one of the first rotor 31 and the second rotor 32 and an engagement projection that projects from the other rotor 31, 32.

Although the fixed friction member 34 is provided independently from the gear housing 21 in the first to third embodiments, the fixed friction portion may be formed on an inner surface of the gear housing 21.

Although the spring 36 is employed as the urging member that urges the movable friction member 33 toward the fixed friction member 34 in the first to third embodiments, the present invention is not restricted to this.

In the first to third embodiments, the first rotor 31 is connected to the rotary shaft 10 and the second rotor 32 is connected to the worm shaft 22. However, the first rotor 31 and the second rotor 32 may be formed integrally with the rotary shaft 10 and the worm shaft 22, respectively.

Although the worm shaft 22 forming the speed reducing mechanism is employed as the driven shaft in the first to third embodiments, the present invention is not restricted to this. For example, a driven shaft having a spur gear may be used.

Although the present invention is embodied as the motor driving the power window device that selectively opens and closes the window glass of the vehicle in the first to third embodiments, the invention is not restricted to this. That is, the invention may be embodied as any suitable motor other than the motor driving the power window device.

In the first to third embodiments, the fixed friction member 34 is provided as an independent component from the brake accommodating recess 21d of the gear housing 21. However, the fixed friction portion may be provided on an inner surface of the brake accommodating recess 21d.

Although the spherical bodies 35 are provided each as the rolling body in the first to third embodiments, a columnar rolling body may be provided in a circumferentially rollable manner.

What is claimed is:

1. A brake device provided between a drive shaft and a driven shaft arranged coaxially with the drive shaft, the device comprising:
   a first rotor provided in a manner rotatable integrally with the drive shaft and having a plurality of engagement portions;
   a second rotor arranged in a manner rotatable integrally with the driven shaft and having a plurality of engagement portions
   wherein the engagement portions of the first rotor and the engagement options of the second rotor are engaged with each other in a rotational direction of the first and second rotors and causes engagement between the first rotor and the second rotor in such a manner as to allow transmission of rotation;
   a braking mechanism including a movable friction member rotatable integrally with the second rotor, a fixed friction portion, and an urging member that urges the movable friction member toward the fixed friction portion, wherein the movable friction member is movable between an engagement position at which the movable friction member contacts and is engaged with the fixed friction portion and a non-engagement position at which the movable friction member is separated from the fixed friction portion; and
   a cam mechanism that moves the movable friction member between the engagement position and the non-engagement position, wherein, when rotational force is provided from the drive shaft to the first rotor, the cam mechanism moves the movable friction member from the engagement position to the non-engagement position so as to allow transmission of the rotation of the drive shaft to the driven shaft through the first rotor and the second rotor, and wherein, when the rotational force is provided from the driven shaft to the second rotor, the cam mechanism maintains the movable friction member at the engagement position so as to restrict the rotation of the driven shaft,
   wherein the cam mechanism is provided independently from the engagement portions.

2. The brake device according to claim 1, wherein the engagement portions causes engagement between the first rotor and the second rotor with the movable friction member arranged at the non-engagement position by the cam mechanism.

3. The brake device according to claim 1, wherein the cam mechanism is one of a plurality of cam mechanisms, the cam mechanisms being spaced apart at equal circumferential intervals and extending along the circumferential direction.

4. The brake device according to claim 1, wherein the cam mechanism includes cam grooves facing each other, one of the cam grooves being provided in the first rotor and the other being formed in the movable friction member, and a spherical body a portion of which is received in the cam groove of the first rotor and the cam groove of the movable friction member.

5. The brake device according to claim 1, wherein the movable friction member and the fixed friction portion are arranged radially outward of the engagement portions.

6. The brake device according to claim 5, wherein the movable friction member and the fixed friction portion are arranged coaxially with each other and each form an annular shape.

7. The brake device according to claim 1,
   wherein the engagement portions being spaced apart at equal circumferential intervals and each extending circumferentially.

8. The brake device according to claim 1, further comprising:
- a first locking member arranged between the first rotor and the movable friction member in order to inseparably lock the first rotor to the movable friction member; and
- a second locking member arranged between the second rotor and the movable friction member in order to inseparably lock the second rotor to the movable friction member.

9. The brake device according to claim 8,
wherein the second locking member includes a driven side locking portion and a brake side locking portion, the driven side locking portion extending axially from the second rotor toward the drive shaft, the brake side locking portion extending axially from the movable friction member toward the driven shaft, and
wherein the driven side locking portion and the brake side locking portion are locked to each other in the axial direction.

10. The brake device according to claim 8,
wherein the first rotor includes a rotation transmitting portion that transmits the rotation of the first rotor to the second rotor,
wherein the second rotor includes an engagement portion engageable with the rotation transmitting portion, and
wherein a buffer member is arranged between the rotation transmitting portion and the engagement portion.

11. The brake device according to claim 10, wherein the buffer member is formed integrally with at least one of the rotation transmitting portion and the engagement portion.

12. The brake device according to claim 1,
wherein the cam mechanism includes a cam portion provided in at least one of the first rotor and the movable friction member at a position at which the first rotor and the movable friction member face each other, and
wherein the cam portion includes a first sloped portion, a holding portion formed continuously from the first sloped portion in a circumferential direction, and a second sloped portion formed continuously from the holding portion in the circumferential direction and at the side opposite to the first sloped portion, the first sloped portion applying operating force to the movable friction member so as to move the movable friction member to the non-engagement position as the first rotor rotates, the holding portion maintaining a constant distance between the movable friction member and the fixed friction portion, the second sloped portion being sloped in the same direction as the first sloped portion.

13. The brake device according to claim 12, wherein the first sloped portion and the second sloped portion are sloped with respect to a plane perpendicular to the axis of the first rotor and the axis of the movable friction member.

14. The brake device according to claim 13, wherein the inclination angle of the second sloped portion is greater than the inclination angle of the first sloped portion.

15. The brake device according to claim 13, wherein the inclination angle of the first sloped portion is smaller than 45 degrees and the inclination angle of the second sloped portion is greater than 45 degrees.

16. The brake device according to claim 12, wherein the cam mechanism has a rolling body a portion of which is received in the cam portion at a position between the first rotor and the movable friction member.

17. The braking device according to claim 16, wherein the cam portion is provided in each one of the first rotor and the movable friction member in such a manner that the cam portions face each other, the rolling body being arranged between the cam portions.

18. A motor with a speed reducing mechanism, comprising:
- a motor body having a drive shaft;
- a speed reducing portion having a worm shaft arranged coaxially with the drive shaft; and
- a brake device arranged between the drive shaft and the worm shaft, wherein the brake device includes:
  - a first rotor provided in a manner rotatable integrally with the drive shaft and having a plurality of engagement portions;
  - a second rotor arranged in a manner rotatable integrally with the driven shaft and having a plurality of engagement portions;
  wherein the engagement portions of the first rotor and the engagement portions of the second rotor are engaged with each other in a rotational direction of the first and second rotors and causes engagement between the first rotor and the second rotor in such a manner as to allow transmission of rotation;
  - a braking mechanism including a movable friction member rotatable integrally with the second rotor, a fixed friction portion, and an urging member that urges the movable friction member toward the fixed friction portion, wherein the movable friction member is movable between an engagement position at which the movable friction member contacts and is engaged with the fixed friction portion and a non-engagement position at which the movable friction member is separated from the fixed friction portion; and
  - a cam mechanism that moves the movable friction member between the engagement position and the non-engagement position, wherein, when rotational force is provided from the drive shaft to the first rotor, the cam mechanism moves the movable friction member from the engagement position to the non-engagement position so as to allow transmission of rotation of the drive shaft to the driven shaft through the first rotor and the second rotor, and wherein, when the rotational force is provided from the driven shaft to the second rotor, the cam mechanism maintains the movable friction member at the engagement position so as to restrict the rotation of the driven shaft,
  wherein the cam mechanism is provided independently from the engagement portions.

* * * * *